(12) United States Patent
Nesnas et al.

(10) Patent No.: US 10,131,183 B2
(45) Date of Patent: Nov. 20, 2018

(54) RIGID WHEEL AND GROUSER DESIGNS FOR OFF-ROAD MOBILITY

(71) Applicants: CALIFORNIA INSTITUTE OF TECHNOLOGY, Pasadena, CA (US); JAPAN AEROSPACE EXPLORATION AGENCY, Tokyo (JP)

(72) Inventors: Issa A. Nesnas, San Marino, CA (US); Masatsugu Otsuki, Kanagawa (JP)

(73) Assignees: CALIFORNIA INSTITUTE OF TECHNOLOGY, Pasadena, CA (US); JAPAN AEROSPACE EXPLORATION AGENCY, Tokyo (JP)

( * ) Notice: Subject to any disclaimer, the term of this patent is extended or adjusted under 35 U.S.C. 154(b) by 27 days.

(21) Appl. No.: 15/348,913

(22) Filed: Nov. 10, 2016

(65) Prior Publication Data
US 2017/0129280 A1    May 11, 2017

Related U.S. Application Data

(60) Provisional application No. 62/254,089, filed on Nov. 11, 2015.

(51) Int. Cl.
*B60B 15/18* (2006.01)
*B60B 11/02* (2006.01)

(52) U.S. Cl.
CPC .............. *B60B 15/18* (2013.01); *B60B 11/02* (2013.01); *B60B 2900/551* (2013.01)

(58) Field of Classification Search
CPC .... B60B 15/18; B60B 11/02; B60B 2900/151
USPC ......................................... 301/43, 44.3, 44.4
See application file for complete search history.

(56) References Cited

U.S. PATENT DOCUMENTS

| | | | | | |
|---|---|---|---|---|---|
| 1,864,467 | A | * | 6/1932 | Bernard ................... | D06F 5/02 68/216 |
| 2,092,275 | A | * | 9/1937 | Geffroy .................. | B60B 15/02 301/43 |
| 4,172,501 | A | * | 10/1979 | Murray ................ | A01B 33/021 172/116 |
| 5,225,010 | A | * | 7/1993 | Shisheng ............ | B60C 11/0302 152/168 |
| 5,451,001 | A | * | 9/1995 | Kumm ................... | A01G 25/09 239/726 |
| 6,273,516 | B1 | * | 8/2001 | Brockway ............... | B60B 15/02 301/43 |

OTHER PUBLICATIONS

Albert, R., et al. "Slow Drag in a Granular Medium." *Physical Review Letters* 82, 205-208, (1999). 4 pages.

(Continued)

*Primary Examiner* — S. Joseph Morano
*Assistant Examiner* — Jean W Charleston
(74) *Attorney, Agent, or Firm* — Steinfl + Bruno LLP

(57) ABSTRACT

A wheel includes a circular wheel main body and at least one grouser. The at least one grouser is provided along an outer circumference of the wheel main body and has a contact surface capable of drawing a first tangent line. The first tangent line is inclined opposite to a rotational direction of the wheel main body from the center line of the wheel main body.

6 Claims, 10 Drawing Sheets

(56) References Cited

OTHER PUBLICATIONS

Blickhan, R. "The Spring-Mass Model for Running and Hopping." *Journal of Biomechanics* 22, 1217-1227, (1989). 11 pages.

Brand, L.R. "Variations in Salamander Trackways Resulting from Substrate Differences." *Journal of Paleontology* 70(6), 1004-1010, (1996). 8 pages.

Cavagna, G.A., et al. "The Sources of External Work in Level Walking and Running." *Journal of Physiology* 262, 639-657, (1976). 19 pages.

Dickinson, M.H., et al. "How Animals Move: An Integrative View." *Science* 288, 100-106, (2000). 8 pages.

Ghiringhelli, G.L., et al. "Multi-Body Analysis of a Tiltrotor Configuration." *Nonlinear Dynamics* 19, 333-357, (1999). 31 pages.

Gravish, N., et al. "Force and flow transition in plowed granular media." *Physical Review Letters* 105, 128301, (2010). 4 pages.

Haruyama, J., et al. "Possible lunar lava tube skylight observed by SELENE cameras." *Geophysical Research Letters* 36, L21206, (2009). 5 pages.

Hill, G., et al. "Scaling vertical drag forces in granular media." *Europhysics Letters* 72, 137-153, (2005). 7 pages.

Holmes, P., et al. "The Dynamics of Legged Locomotion: Models, Analyses, and Challenges." *SIAM Review* 48, 207-304, (2006). 100 pages.

Inotsume, H., et al. "Analysis of Grouser Performance to Develop Guidelines for Design for Planetary Rovers." *Proceedings of the $12^{th}$ International Symposium on Artificial Intelligence, Robotics and Automation in Space (i-SAIRAS)*, 1-9, (2014). 8 pages.

Kamrin, K., et al. "Nonlocal Constitutive Relation for Steady Granular Flow." *Physical Review Letters* 108, 178301, (2012). 6 pages.

Lauder, G.V., et al. "Experimental Hydrodynamics and Evolution: Function of Median Fins in Ray-finned Fishes." *Integrative and Comparative Biology* 42, 1009-1017, (2002). 9 pages.

Lauder, G.V., et al. "Fish biorobotics: kinematics and hydrodynamics of self-propulsion." *The Journal of Experimental Biology* 210, 2767-2780, (2007). 14 pages.

Li, C. et al. "Multi-functional foot use during running in the zebra-tailed lizard (*Callisaurus draconoides*)." *The Journal of Experimental Biology* 215, 3293-3308, (2012). 16 pages.

Li C. et al."A Terradynamics of Legged Locomotion of Granular Media." *Science* 339, 1408-1412, (2013). 33 pages.

"Concepts and Approaches for Mars Exploration." *Lunar and Planetary Institute*. Accessed online Jul. 26, 2018 via http://www.lpi.usra.edu/meetings/marsconcepts2012/. 3 pages.

Maladen, R.D., et al. "Undulatory Swimming in Sand: Subsurface Locomotion of the Sandfish Lizard." *Science* 325, 314-318, (2009). 6 pages.

Mazouchova, N., et al. "Utilization of granular solidification during terrestrial locomotion of hatchling sea turtles." *Biology Letters* 6, 398 (2009). 4 pages.

Otsuki, M., et al. "Development of Planetary Exploration Rover with Advanced Mobility and Intelligence." *Proceedings of the $12^{th}$ International Symposium on Artificial Intelligence, Robotics and Automation in Space (i-SAIRAS)*, (2014). 6 pages.

Paulsen, G.L., et al. "All Terrain Exploration with the Cliff-bot System." *Proceedings of the 2005 IEEE International Conference on Robotics and Automation*, 721-726, (2005). 6 pages.

Raibert, M., et al. "BigDog, the Rough-Terrain Quadruped Robot." In *Proceedings of the $17^{th}$ World Congress, The International Federation of Automatic Control*, 10822-10825, (2008). 4 pages.

Senatore, C., et al. "Modeling and Validation of Mobility Characterstics of the Mars Science Laboratory Curiosity Rover." *Proceedings of the $12^{th}$ International Symposium on Artificial Intelligence, Robotics and Automation in Space (i-SAIRAS)*, (2014). 8 pages.

Skonieczny, K., et al. "A Grouser Spacing Equation for Determining Appropriate Geometry of Planetary Rover Wheels." *Proceedings 2012 IEEE/RSJ International Conference on Intelligent Robots and Systems*, pp. 5065-5070, (2012). 6 pages.

Squyres, S.W., et al. "Athena Mars rover science investigation." *Journal of Geophysical Research* 108(E12), 8062, (2003). 21 pages.

Ulamec, S., et al. "Hopper concepts for small body landers." *Advances in Space Research* 47, 428-439, (2011). 12 pages.

Wang, Z.J. "Dissecting Insect Flight." *Annual Review of Fluid Mechanics* 37, 183-210, (2005). 28 pages.

Welch, R., et al. "Systems Engineering the Curiosity Rover: A Retrospective." *2013 $8^{th}$ International Conference on System of Systems Engineering (SoSE)*, 70-75, (2013). 6 pages.

Yoshida, K., et al. "Development and Field Testing of Moonraker: a Four-Wheel Rover in Minimal Design." *Proceedings of the $12^{th}$ International Symposium on Artificial Intelligence, Robotics and Automation in Space (i-SAIRAS)*, (2014). 5 pages.

Zhou, F., et al. "Simulations of Mars Rover Traverses." *Journal of Field Robotics* 31, 141-160, (2014). 20 pages.

Abad-Manterola, P., et al. "Axel: A minimalist tethered rover for exploration of extreme planetary terrains." *IEEE Robotics and Automation Magazine* 16.4, 44-52, (Dec. 2009). 11 pages.

Abad-Manterola, P., et al. "Motion Planning on Steep Terrain for the Tethered Axel Rover." *IEEE International Conference on Robotics and Automation* (May 2011): 4188-4195. 9 pages.

Bares, J.E., et al. "Dante II: Technical Description, Results, and Lessons Learned." *The International Journal of Robotics Research* 18(7), 621-649, (Jul. 1999). 29 pages.

Carrier, D.W., et al. "Soviet Rover Systems." *AIAA Space Programs and Technologies Conference* (Mar. 1992). 9 pages.

Chaudhuri, B., et al. "Cohesive effects in powder mixing in a tumbling blender." *Powder Technology* 165(2), 105-114 (Jul. 2006). 12 pages.

Cho, G-C., et al. "Particle Shape Effects on Packing Density, Stiffness, and Strength: Natural and Crushed Sands." *Journal of Geotechnical and Geoenvironmental Engineering* 132, 591-602, (May 2006). 14 pages.

Ding, L., et al. "Interaction Mechanics Model for Rigid Driving Wheels of Planetary Rovers Moving on Sandy Terrain with Consideration of Multiple Physical Effects." *Journal of Field Robotics* 32(6), 827-859, (Aug. 2014). 34 pages.

Ding, Y., et al. "Drag Induced Lift in Granular Media." *Physical Review Letters* 106, 028001, (Jan. 2011). 4 pages.

Fancy, S.G., et al. "Energy Expenditures by Caribou while Cratering in Snow." *The Journal of Wildlife Management* 49(4), 987-993, (Oct. 1985). 8 pages.

Fearing, R.S., et al. "Wing Transmission for a Micromechanical Flying Insect." *IEEE International Conference on Robotics and Automation*, 1509-1516, (Apr. 2000). 9 pages.

Ishigami, G., et al. "Terramechanics-Based Model for Steering Maneuver of Planetary Exploration Rovers on Loose Soil." *Journal of Field Robotics* 24(3), 233-250 (Mar. 2007). 19 pages.

Jaumann, R., et al. "A Mobile Asteroid Surface Scout (MASCOT) for the Hayabusa 2 Mission to 1999 JU3: The Scientific Approach." *Lunar and Planetary Science Conference* 44, 1500, (Mar. 2013). 3 pages.

Johnson, A.M., et al. "Autonomous Legged Hill and Stairwell Ascent." *IEEE International Symposium on Safety, Security and Rescue Robotics*, 134-142, (Nov. 2011). 10 pages.

Lakdawalla, E. "China lands on the Moon." *Nature Geoscience* 7, 81, (Feb. 2014). 1 page.

Lauga, E., et al. "The hydrodynamics of swimming microorganisms." *Reports on Progress in Physics* 72, 096601, (Aug. 2009). 37 pages.

Li, C. et al. "Sensitive dependence of the motion of a legged robot on granular media." *PNAS* 106(9), 3029-3034, (Mar. 2009). 6 pages.

Meirion-Griffith, G., et al. "A modified pressure-sinkage model for small, rigid wheels on deformable terrains." *Journal of Terramechanics* 48, 149-155, (Apr. 2011). 7 pages.

Meirion-Griffith, G., et al. "An Empirical Study of the Terramechanics of Small Unmanned Ground Vehicles." *IEEE Aerospace Conference*, (Mar. 2010). 7 pages.

Nesnas, I.A.D., et al. "Axel and DuAxel Rovers for the Sustainable Exploration of Extreme Terrains." *Journal of Field Robotics* 29(4), 663-685, (Feb. 2012). 24 pages.

(56) References Cited

OTHER PUBLICATIONS

Reece, A.R., "Principles of Soil-Vehicle Mechanics." *Proceedings of the Institution of Mechanical Engineers: Automobile Division* 180, 45-66, (Jan. 1965). 24 pages.

Shankar, K., et al. "Motion Planning and Control for a Tethered, Rimless Wheel Differential Drive Vehicle." *Proceedings on International Conference on Intelligent Robots and Systems (IROS)*, 4829-4836, (Nov. 2013). 9 pages.

Ulamec, S., et al. "Rosetta Lander—Philae: Implications of an alternative mission." *Acta Astronautica* 58, 435-441, (Apr. 2006). 9 pages.

Vitt, L.J., et al. "Life on the Leaf Litter: The Ecology of Anolis nitens tandai in the Brazilian Amazon." *Copeia* 2001(2), 401-412, (May 2001). 13 pages.

Wakabayashi, S., et al. "Design and mobility evaluation of tracked lunar vehicle." *Journal of Terramechanics* 46, 105-114, (Jun. 2009). 10 pages.

Wilcox, B., et al. "Sojourner on Mars and Lessons Learned for Future Planetary Rovers." *SAE Technical Paper 981695*, (1998). 8 pages.

Wilcox, B., et al. "The MUSES-CN Nanorover Mission and Related Technology." *Proceedings on the IEEE Aerospace Conference, 2000* 7, 287-295, (Mar. 2000). 9 pages.

Wong, J-Y., et al. "Prediction of Rigid Wheel Performance Based on the Analysis of Soil-Wheel Stresses. Part I. Performance of Driven Rigid Wheels." *Journal of Terramechanics* 4(1), 81-98, (1967). 20 pages.

Zacny, K., et al. "Axel Rover NanoDrill and PowderDrill: Acquisition of Cores, Regolith and Powder from Steep Walls." *Proceedings on the IEEE Aerospace Conference, 2013* (Mar. 2013). 12 pages.

Zhang, T., et al. "Ground fluidization promotes rapid running of a lightweight robot." *The International Journal of Robotics Research* 32(7), 859-869, (Jul. 2013). 12 pages.

* cited by examiner

RIGID WHEEL AND GROUSER DESIGNS FOR OFF-ROAD MOBILITY

CROSS REFERENCE TO RELATED APPLICATIONS

This application claims priority to U.S. Provisional Application No. 62/254,089 filed on Nov. 11, 2015, the contents of which are incorporated herein by reference in their entirety.

STATEMENT REGARDING FEDERALLY SPONSORED RESEARCH OR DEVELOPMENT

The invention described herein was made in the performance of work under a NASA contract NNN12AAO1C, and is subject to the provisions of Public Law 96-517 (35 USC 202) in which the Contractor has elected to retain title.

BACKGROUND

The present disclosure relates to a wheel and grouser for use in a mechanical vehicle traveling on soft ground such as sand, dirt, mud, and a field. Grousers are used to increase traction on certain types of terrains, such as rough terrains.

Examples of mechanical vehicles that move on terrains of soft soil include vehicles for planetary exploration, off-road vehicles, mechanical vehicles for construction and engineering, and mechanical vehicles for agriculture. Wheels used for those vehicles need to acquire a large drawbar pull in proportion to the amount of sinkage into the ground.

A metal vehicle mounted to a lunar/planetary rover includes wheels, each of which includes grousers provided along the outer circumference of the wheel and protruding in a center-line direction, for example (see, Squyres, S. W., Arvidson, R. E., and et. al (2003), Athena mars rover science investigation, J. Geophysical Researchs, 108(E12):8062, and Welch, R., Limonadi, D., and Manning, R. (2013), Systems engineering the curiosity rover: A retrospective. Proc.2013 8th International Conference on System of Systems Engineering, pages 70-75), the disclosures of both of which are incorporated by reference in their entirety.

SUMMARY

The wheel described above can yield a large drawbar pull in proportion to the amount of sinkage into the ground when traveling on terrains of soft soil. However, an increase in the amount of sinkage leads to an increase in traveling resistance, and a decrease in traveling efficiency. The wheels can sometimes become deeply trapped in the ground and difficult to move, or even stuck in the ground. In this case, increasing the number of wheels can enlarge a total ground contact area and reduce the amount of sinkage, but this can in turn increase a total size and weight of the vehicle, which can be a disadvantage in certain applications, such as a space rover where size and weight are constrained.

In view of the circumstances as described above, it can be desirable to provide a wheel capable of obtaining a large drawbar pull with a small amount of sinkage.

According to an embodiment of the present disclosure, a wheel is described, comprising a cylindrical main body and at least one grouser. The at least one grouser is provided along an outer circumference of the wheel main body and has a contact surface capable of drawing a first tangent line, the first tangent line being inclined opposite to a rotational direction of the wheel main body from the center line of the wheel main body.

The inventors of the present disclosure designed optimal grouser shapes of a wheel surface on the basis of a sinkage-pressure relational expression experimentally calculated, which is called Resistive Force Theory (see, Li, C., Zhang, T., and Goldman, D. I. (2013). A terradynamics of legged locomotion on granular media. Science, 339:1408-1412, the disclosure of which is incorporated by reference in its entirety).

As a result of the analytical calculation for optimization, based on the calculus of variations, an optimal result was derived when the grouser shape was varied according to a rotational angle. However, it may not be practical to vary the grouser shape according to the rotational angle of the wheel. In this regard, a linear optimization calculation was performed, so that the grouser shape was the same as the shape used for the Buchanan's puddle wheel, the Morgan wheel, and other similar shapes. The inventors of the present disclosure further performed the calculations for optimization, verified various grouser shapes, and arrived at the embodiments described in the present disclosure. Interestingly, it was found that a wheel according to one embodiment of the present disclosure obtains not only a large drawbar pull with a small amount of sinkage but also a reduced amount of sinkage.

In this case, the at least one grouser can comprise a projection member, the projection member being inclined opposite to the rotational direction of the wheel main body from the center line of the wheel main body, and having a contact surface with a rectangular shape.

In some embodiments, the center line of the wheel main body and the contact surface of the projection member can define an angle of approximately 90 degrees.

In some embodiments, the at least one grouser can comprise a member having a contact surface with a cylindrical shape, for example a quarter cylindrical shape. In some embodiments, the member is a portion of a cylinder for example, its cross section may be half a cylinder or a quarter of a cylinder. For example, the shape of the grouser may be almost a quarter arc.

In some embodiments, the center line of the wheel main body, and a second tangent line of the quarter cylindrical member at a position on the outer circumference of the wheel main body, coincide with each other, or almost coincide.

When a height of the quarter cylindrical member, in a direction of the center line of the wheel main body, is denoted as $h_1$, and a radius of the quarter cylindrical member is denoted as $r_1$, the following expression is can be satisfied:

$$0.5 \leq r_1/h_1 \leq 3.$$

The $r_1/h_1$ ratio can be, in some embodiments, approximately 1. Setting the $r_1/h_1$ ratio to approximately 1 facilitates manufacturing of the wheel and mounting thereof to a vehicle or the like.

The at least one grouser can comprise, in some embodiments, 1 to 48 grousers.

The at least one grouser can comprise, in some embodiments, 24 grousers.

According to another embodiment of the present disclosure, there is provided a wheel including a circular wheel main body and at least one grouser. The at least one grouser is positioned along an outer circumference of the wheel main body and has a first contact surface and a second contact surface. The first contact surface can draw a first tangent line that is inclined opposite to a first rotational direction of the wheel main body from a first center line of the wheel main body. The second contact surface can draw a second tangent line that is inclined opposite to a second rotational direction from a second center line of the wheel main body, the second rotational direction being a direction opposite to the first rotational direction.

In some embodiments, the at least one grouser comprises a ridge line at which the first contact surface and the second contact surface intersect with each other.

The first center line of the wheel main body and the first contact surface can define an angle of approximately 90 degrees, and the second center line of the wheel main body and the second contact surface can define an angle of approximately 90 degrees.

In some embodiments, the at least one grouser can include 6 grousers. An increase in the number of grousers can provide a larger drawbar pull with a smaller amount of sinkage. However, setting the number of grousers to 6 can enable the grousers to have no overlaps on the outer circumference of the wheel main body.

The at least one grouser can comprise a half columnar member in which the first contact surface having an almost quarter arc shape and the second contact surface having an almost quarter arc shape are continuous.

In some embodiments, the center line of the wheel main body and each of a third tangent line and a fourth tangent line of the half columnar member at a corresponding position on the outer circumference of the wheel main body can almost coincide with each other.

When a height of the half columnar member in a direction of the center line of the wheel main body is denoted as $h_1$, and a radius of the first contact surface and the second contact surface each having the arc shape is denoted as $r_1$, the following expression can be satisfied:

$$0.5 \leq r_1/h_1 \leq 3.$$

The $r_1/h_1$ ratio can be, in some embodiments, approximately 1.

According to another embodiment of the present disclosure, there is provided a wheel system including wheels with coaxial axes. The wheels can each comprise a circular wheel main body and at least one grouser along an outer circumference of the wheel main body having a first contact surface and a second contact surface. In some embodiments, the first contact surface can draw a first tangent line that is inclined opposite to a first rotational direction of the wheel main body from a first center line of the wheel main body. The second contact surface can draw a second tangent line that is inclined opposite to a second rotational direction from a second center line of the wheel main body, the second rotational direction being a direction opposite to the first rotational direction.

In this embodiment, the at least one grouser of each of the wheels can comprise a ridge line at which the first contact surface and the second contact surface intersect with each other.

In some embodiments, each of the wheels can comprise an equal number of ridge lines, and the wheels can be arranged such that positions of the ridge lines of the wheels in an axial direction of the wheels do not coincide with positions of the ridge lines of the adjacent wheels in the axial direction of the wheels.

According to the present disclosure, it is possible to obtain a large drawbar pull with a small amount of sinkage and further obtain a reduced amount of sinkage.

These and other objects, features and advantages of the present disclosure will become more apparent in light of the following detailed description of embodiments thereof, as illustrated in the accompanying drawings.

DETAILED DESCRIPTION

Hereinafter, embodiments of the present disclosure will be described with reference to the drawings.

First Embodiment

Figure 1:
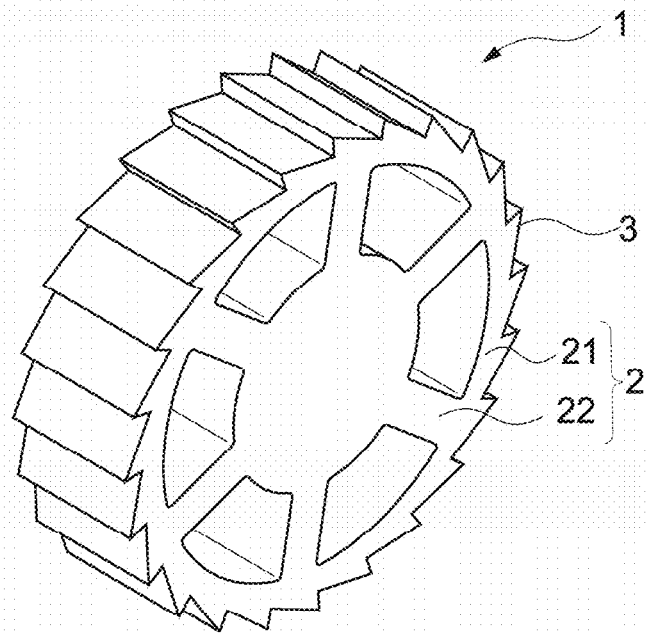
FIG. 1 is a perspective view of a wheel according to a first embodiment of the present disclosure.
Figure 2:
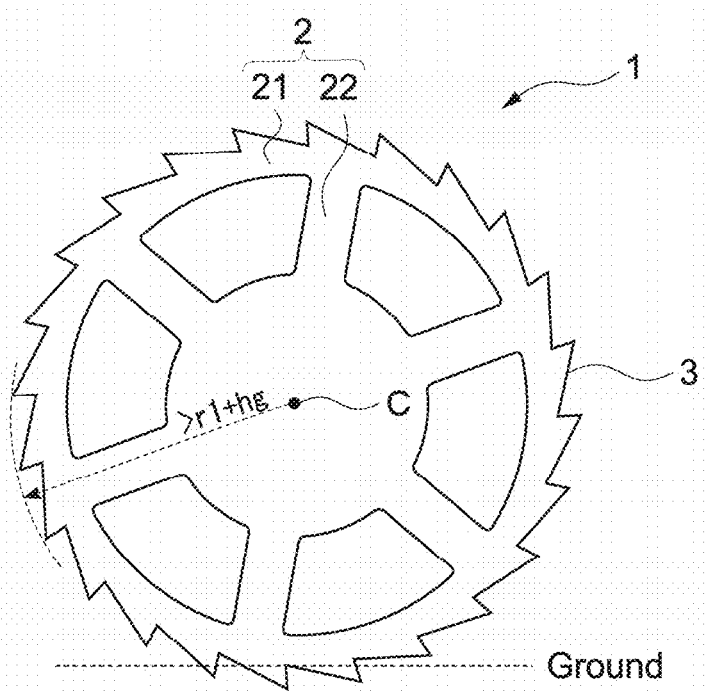
FIG. 2 is a side view of the wheel shown in FIG. 1.
Figure 3:
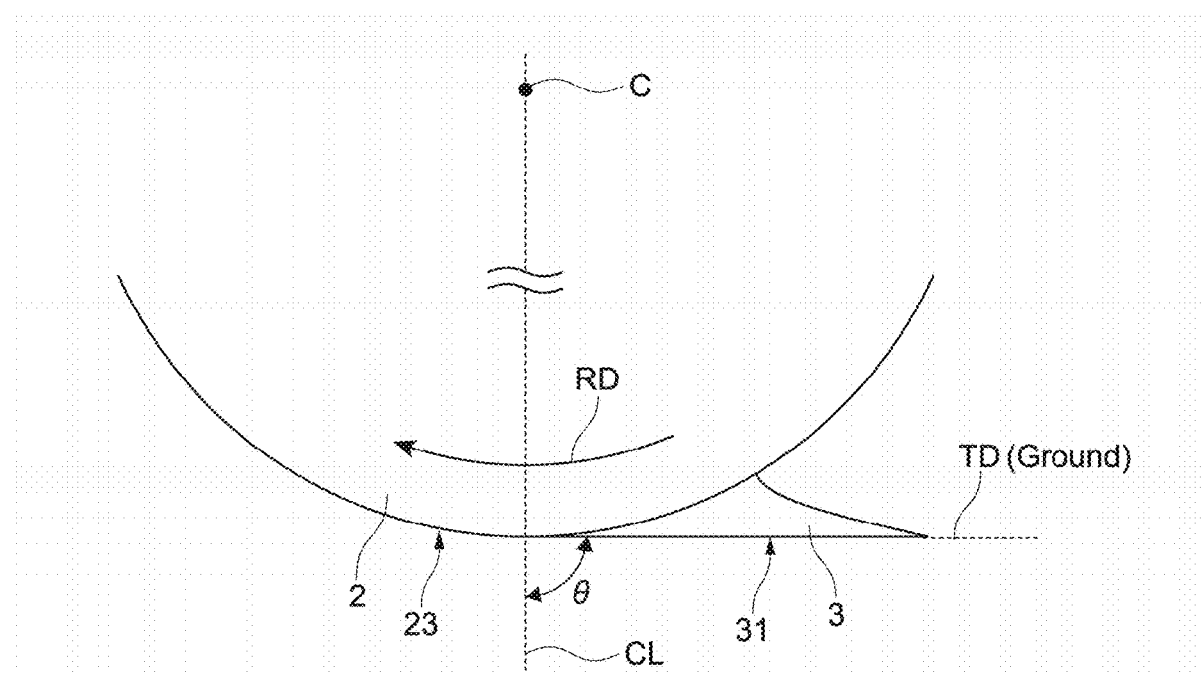
FIG. 3 is a partially enlarged view of the wheel shown in FIGS. 1 and 2.

FIG. 1 is a perspective view of a wheel according to a first embodiment of the present disclosure. FIG. 2 is a side view of the wheel shown in FIG. 1. FIG. 3 is a partially enlarged view of the wheel shown in FIGS. 1 and 2.

Figure 8:
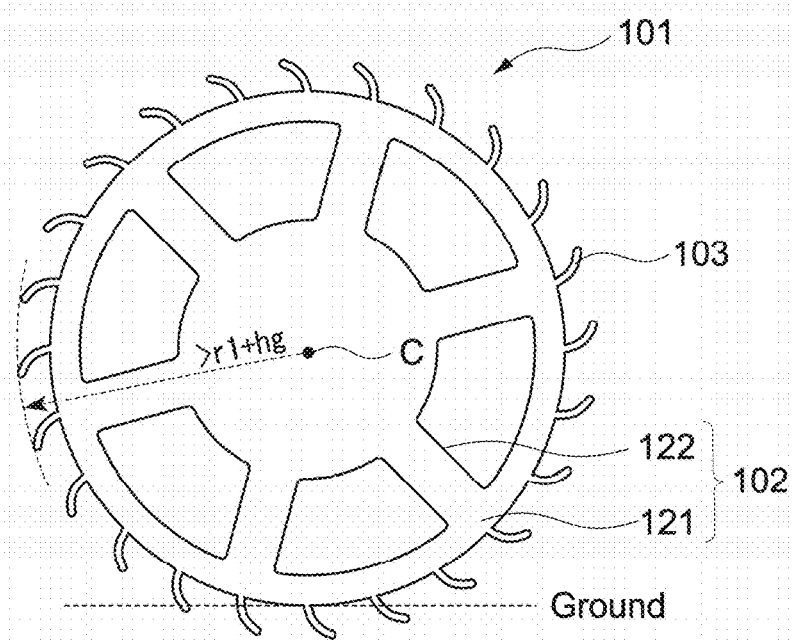
FIG. 8 is a side view of a wheel according to a second embodiment of the present disclosure.

As shown in those figures, a wheel 1 can comprise a circular wheel main body 2 and a plurality of grousers 3. The grousers can have various shapes in cross section, such as, for example, triangular or trapezoidal, circular, half-circular, etc. The half-circular cross section can also be referred to as a half cylinder, while a cross section of a quarter of a circle can be referred to as quarter cylinder. These cross sections may be filled or empty. For example, FIG. 8 illustrates grousers having a cross section of a partial circle, and an empty portion, so the actual solid cross section can be an arc of a circle. In other embodiments, the empty portion may be filled as to form, for example, a cross section being a quarter of a solid cylinder.

With reference to FIG. 1, the wheel 1 is typically used for mechanical vehicles that move on terrains of soft soil, such as vehicles for planetary exploration, off-road vehicles, mechanical vehicles for construction and engineering, and mechanical vehicles for agriculture.

The wheel main body 2 can comprise a rim 21 and a plurality of spokes 22. The wheel main body 2 may have various forms. The wheel main body 2 has an outer circumference 23 having a circular shape and a predetermined width.

The grousers 3 are positioned along the outer circumference 23 of the wheel main body 2 typically at predetermined intervals. Each of the grousers 3 typically has substantially the same shape and size. However, in other embodiments the grousers may be different from each other. Each of the grousers 3 has a contact surface 31 drawing a tangent line TD. The tangent line TD is inclined opposite to a rotational direction RD of the wheel main body 2 from a center line CL of the wheel main body 2. In FIG. 3, C represents the center point of the circular wheel main body 2. The contact surface 31 is typically a rectangular surface.

Each of the grousers 3 can comprise a projection member having the contact surface 31 and opposite to the rotational direction RD of the wheel main body 2 from the center line CL of the wheel main body 2.

In some embodiments, an angle θ defined by the center line CL of the wheel main body 2 and the contact surface 31 of the grouser 3 may be larger than 0 degrees and smaller than 90 degrees. The angle θ defined by the center line CL of the wheel main body 2 and the contact surface 31 of the grouser 3 can be, for example, greater than 10 degrees and smaller than 90 degrees. In some embodiments, the angle θ defined by the center line CL of the wheel main body 2 and the contact surface 31 of the grouser 3 can be approximately 90 degrees. The "approximately 90 degrees" described here can be, for example, 89 degrees to 90 degrees.

The number of grousers 3 can be, in some embodiments, between 1 and 48. The number of grousers 3, for example, can be 24. An increase in the number of grousers 3 can provide a larger drawbar pull by a smaller amount of sinkage. However, setting the number of grousers 3 to the above values enables the grousers 3 to be provided without overlaps on the outer circumference 23 of the wheel main body 2. Therefore, the number of grousers may vary depending on the radius of the wheel.

In several embodiments, the wheel main body 2 and the grousers 3 are substantially rigid. The wheel 1 can be fabricated by attaching the grousers 3 to the wheel main body 2. The wheel 1 may be fabricated by integrating the wheel main body 2 and the grousers 3. The grousers 3 and/or a part of the wheel main body 2 may be made of elastic body such as rubber, like a tire of an automobile, for example.

When a vehicle equipped with the wheel 1 travels on soft ground such as sand, dirt, mud, and a field, as shown in FIG. 3, the wheel 1 rotates in the rotational direction RD. The contact surface 31, which is a flat of the grouser 3 of the wheel 1, gradually sinks into the surface of the soft ground by the rotation of the wheel 1. Subsequently, the contact surface 31 gradually emerges from the surface of the soft ground by the rotation of the wheel 1. The grousers 3 having different phases in the rotational direction of the wheel 1 sequentially repeat such an operation. With this operation, the vehicle equipped with the wheel 1 obtains a drawbar pull and moves from the left to the right in FIG. 3.

When traveling on the soft ground such as sand, dirt, mud, and a field, the vehicle equipped with the wheel 1 can obtain a large drawbar pull by a small amount of sinkage from the wheel 1 and further obtain a reduced amount of sinkage of the wheel 1, compared to a vehicle equipped with a wheel of the related art.

Figure 4:
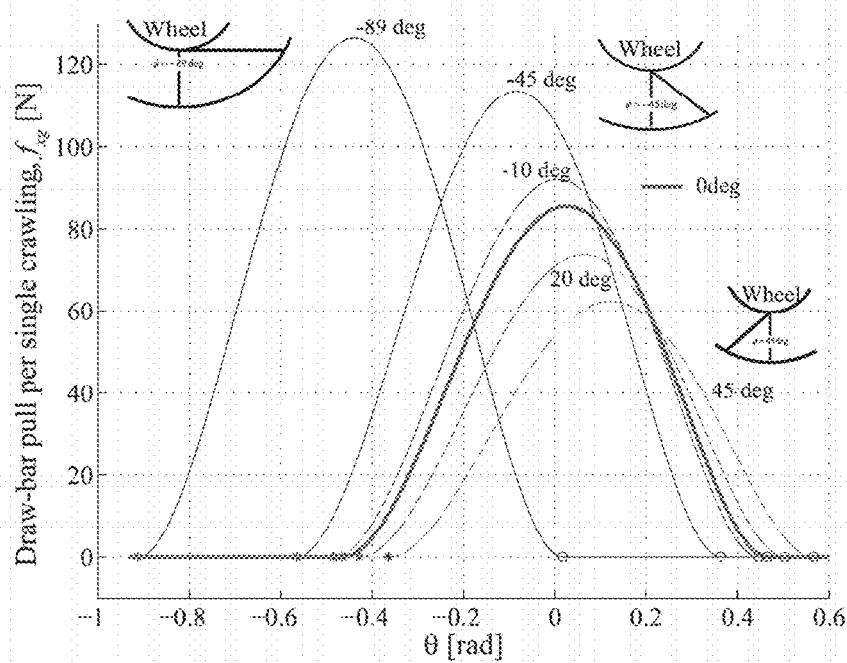
FIG. 4 is a graph showing results of an analysis of a relationship between an inclination angle of a rectangular grouser and a drawbar pull of the wheel.
Figure 5:
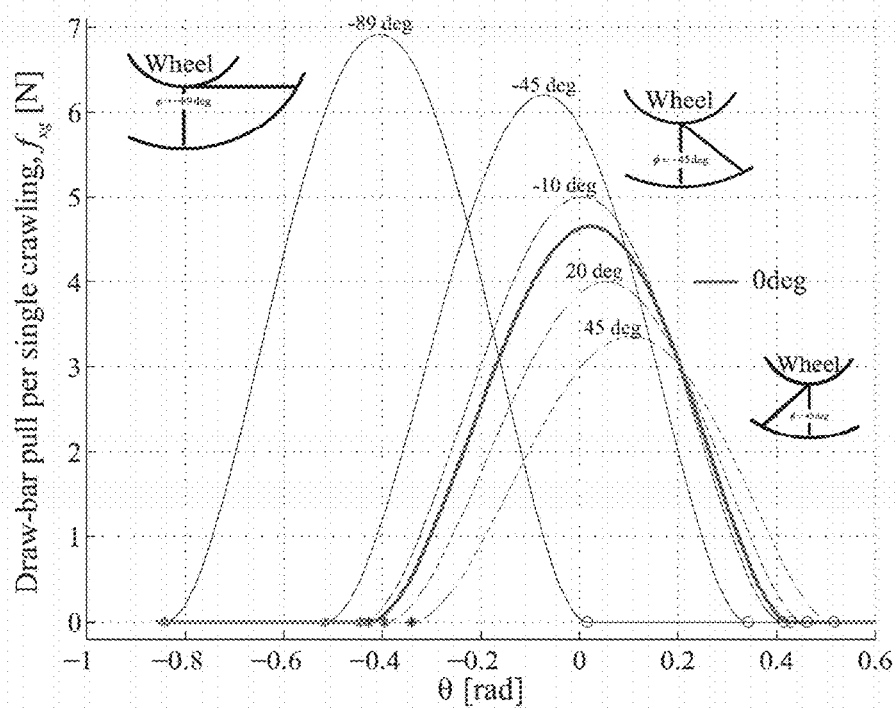
FIG. 5 is a graph showing results of another analysis of the relationship between the inclination angle of the rectangular grouser and the drawbar pull of the wheel.

FIGS. 4 and 5 are graphs each showing a relationship between an inclination angle of the grouser 3 and a drawbar pull of the wheel 1. FIG. 4 shows a case where the wheel main body 2 has a diameter of 840 mm. FIG. 5 shows a case where the wheel main body 2 has a diameter of 200 mm. Those values are calculated for one grouser 3 of the wheel 1.

In the x axis of FIGS. 4 and 5, θ(rad) represents an angle defined by the ground and a line connecting the center line CL of the wheel main body 2 and a position where a predetermined grouser 3 is fixed. The entry side of the predetermined grouser 3 to the ground has θ in a positive value, and the departure side of the predetermined grouser 3 from the ground has θ in a negative value. φ represents an angle defined by the center line CL of the wheel main body 2 and the grouser 3. When the grouser 3 is inclined opposite to the rotational direction RD of the wheel main body 2 from the center line CL of the wheel main body 2, the angle φ is negative.

As can be seen from FIGS. 4 and 5, when the angle φ is −10 degrees, −45 degrees, and −89 degrees, that is, when the grouser 3 is inclined at 10 degrees, 45 degrees, and 89 degrees opposite to the rotational direction RD of the wheel main body 2 from the center line CL of the wheel main body 2, peaks of the drawbar pull and integrated values of the drawbar pull are larger than those obtained when the grouser 3 is inclined at 0 degrees or 20 degrees. When the angle φ is −89 degrees, that is, when the grouser 3 is inclined at approximately 90 degrees opposite to the rotational direction RD of the wheel main body 2 from the center line CL of the wheel main body 2, the peak of the drawbar pull and the integrated value of the drawbar pull are maximized.

Figure 6:
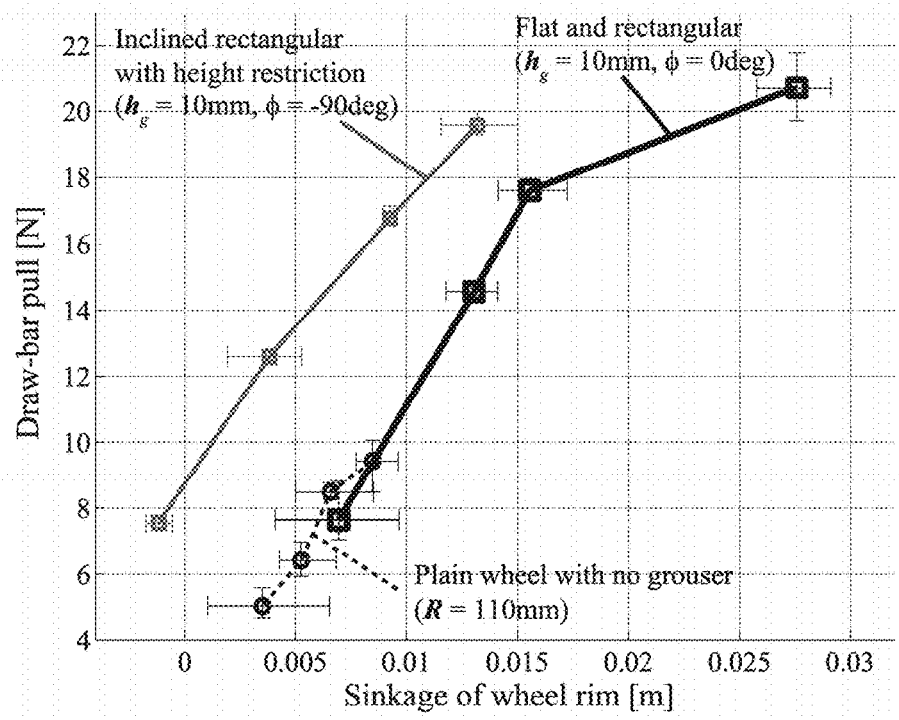
FIG. 6 is a graph showing results of experiments performed to calculate a relationship between the amount of sinkage of the rectangular grouser and the drawbar pull of the wheel.

FIG. 6 is a graph showing results of experiments performed to calculate a relationship between the amount of sinkage of the grouser 3 and the drawbar pull of the wheel 1.

In FIG. 6, $h_g$ represents the length of the grouser 3, and φ represents an angle defined by the center line CL of the wheel main body 2 and the grouser 3. When the grouser 3 is inclined opposite to the rotational direction RD of the wheel main body 2 from the center line CL of the wheel main body 2, the angle φ is negative.

In FIG. 6, data referring to "Inclined rectangular with height restriction ($h_g$=10 mm, −90 deg)" represents a relationship between the amount of sinkage and the drawbar pull of the wheel 1 when the grouser 3 having a height of 10 mm is inclined at 90 degrees opposite to the rotational direction RD of the wheel main body 2 from the center line CL of the wheel main body 2, that is, a relationship between the amount of sinkage and the drawbar pull of the wheel according to the first embodiment of the present disclosure.

In FIG. 6, data referring to "Flat and rectangular ($h_g$=10 mm, 0 deg)" represents a relationship between the amount of sinkage and the drawbar pull of the wheel 1 when the grouser 3 having a height of 10 mm is directed to the same direction as the center line CL of the wheel main body 2, that is, a relationship between the amount of sinkage and the drawbar pull of a wheel of the related art.

In FIG. 6, data referring to "Plain wheel with no grouser (R=110 mm)" represents a relationship between the amount of sinkage and the drawbar pull of a wheel having no grousers and a radius of 110 mm of the related art.

As understood by the person of ordinary skill in the art, a traverse line at each point represents a range of variations in measurement, that is, the error range.

From the measurement results of FIG. 6, it is found that the wheel 1 according to the first embodiment of the present disclosure can obtain a larger drawbar pull by a smaller amount of sinkage and obtain a reduced amount of sinkage, compared to a wheel of the related art. Further, it is found that the wheel 1 according to the first embodiment of the present disclosure can obtain a drawbar pull even when the amount of sinkage is 0. This fact has not been achieved by a wheel of the related art in the literature.

Figure 7:
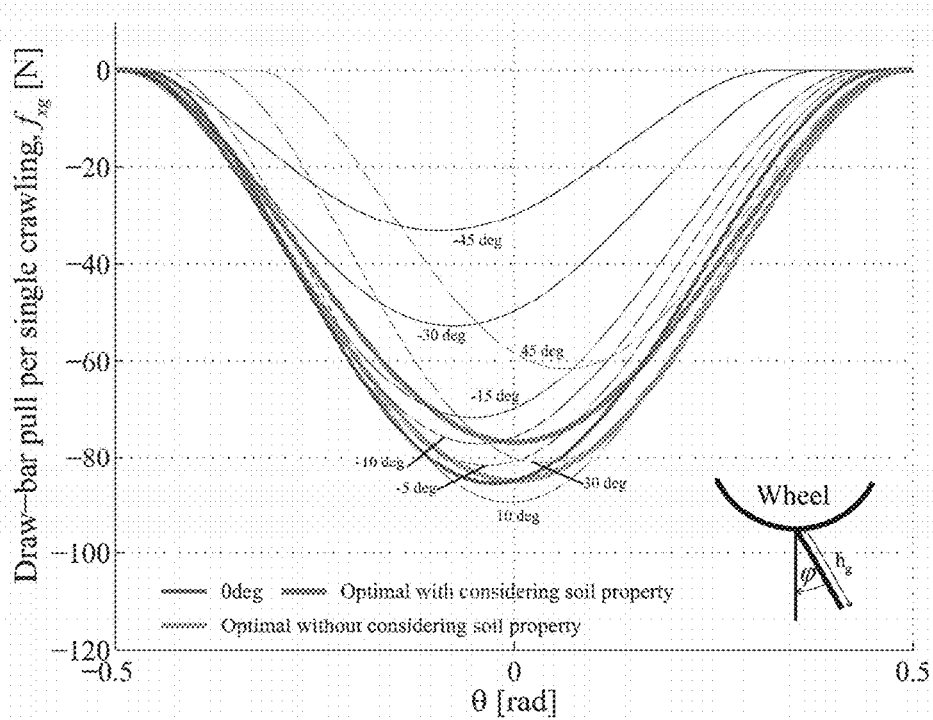
FIG. 7 is a graph showing results of an analysis of a resistance force that the wheel including the rectangular grousers receives from the ground through traveling.

FIG. 7 is a graph showing results of an analysis of a resistance force that the wheel 1 receives from the ground through traveling.

In the x axis of FIG. 7, $\theta$(rad) represents an angle defined by the ground and a line connecting the center line CL of the wheel main body 2 and a position where a predetermined grouser 3 is fixed. The entry side of the predetermined grouser 3 to the ground has $\theta$ in a positive value, and the departure side of the predetermined grouser 3 from the ground has $\theta$ in a negative value.

In FIG. 7, $\varphi$(deg) represents an angle defined by the center line CL of the wheel main body 2 and the grouser 3. When the grouser 3 is inclined opposite to the rotational direction RD of the wheel main body 2 from the center line CL of the wheel main body 2, the angle $\varphi$ is negative.

In FIG. 7, data referring to "Optimal with considering soil property" represents an ideal value when soil properties are accounted for in the model, and "Optimal without considering soil property" represents an ideal value when soil properties are not accounted for in the model.

When $\varphi$(deg) is −45 degrees, −30 degrees, −10 degrees, and −5 degrees, that is, in the case of the grouser 3 according to the first embodiment of the present disclosure, it is found that the resistance force that the wheel 1 receives from the ground is small.

Second Embodiment

Figure 9:
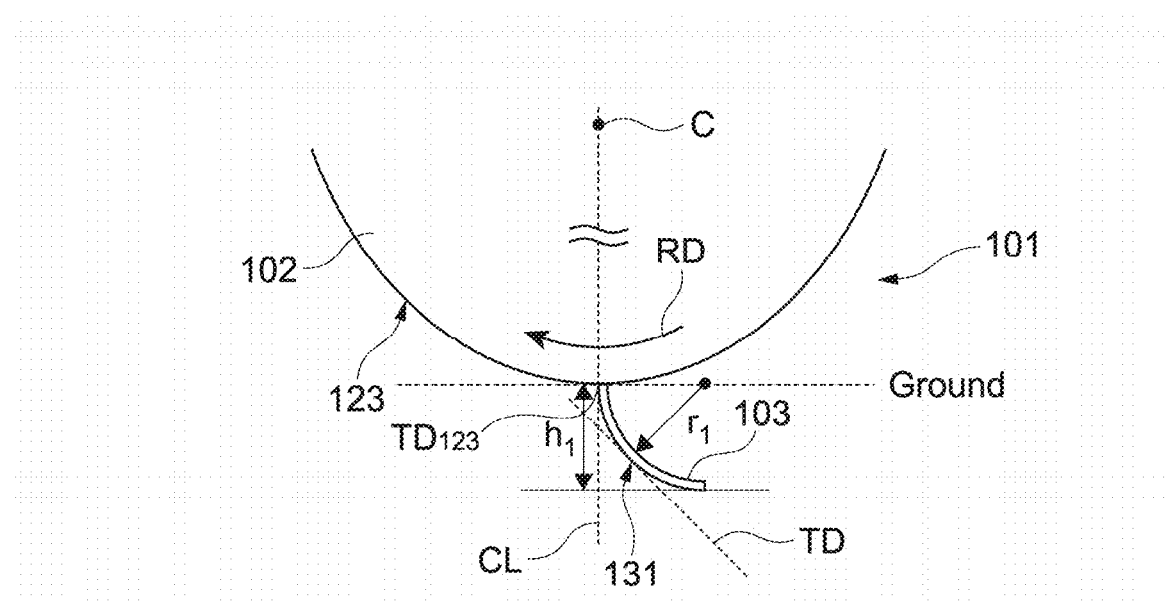
FIG. 9 is a partially enlarged view of the wheel shown in FIG. 8.

FIG. 8 is a side view of a wheel according to a second embodiment of the present disclosure. FIG. 9 is a partially enlarged view of FIG. 8.

As shown in those figures, a wheel 101 includes a circular wheel main body 102 and a plurality of grousers 103.

The wheel main body 102 typically includes a rim 121 and a plurality of spokes 122. The wheel main body 102 has an outer circumference 123 having a circular shape and a predetermined width.

The grousers 103 are located along the outer circumference 123 of the wheel main body 102 typically at predetermined intervals. Each of the grousers 103 typically has substantially the same shape and size. Each of the grousers 103 comprises a member having a contact surface 131 and extending over an area of a quarter of a cylinder, although, as visible in FIG. 9, the member does not fill the area entirely, but rather is within the area. The contact surface 131 has an almost quarter arc shape. The almost quarter arc-shaped contact surface 131 is capable of drawing a tangent line TD. The tangent line TD is inclined opposite to a rotational direction RD of the wheel main body 102 from a center line CL of the wheel main body 102.

The center line CL of the wheel main body 102 almost coincides with a tangent line $TD_{123}$ of the quarter cylindrical member (grouser 103) at a position on the outer circumference 123 of the wheel main body 102.

When a height of the quarter cylindrical member in a direction of the center line CL of the wheel main body 102 is denoted as $h_1$ and a radius of the quarter cylindrical member is denoted as $r_1$, the following expression can be satisfied:

$$0.5 \leq r_1/h_1 \leq 3.$$

In some embodiments, the $r_1/h_1$ ratio is approximately 1.

In some embodiments, the number of grousers 103 can be between 1 and 48. The number of grousers 103, in some embodiments, is 24. An increase in number of grousers 103 can provide a larger drawbar pull by a smaller amount of sinkage. However, setting the number of grousers 103 to the above values enables the grousers 103 to be positioned without overlaps on the outer circumference 123 of the wheel main body 102.

In several embodiments, the wheel main body 102 and the grouser 103 are substantially rigid. The wheel 101 can be fabricated by attaching the grousers 103 to the wheel main body 102. The wheel 101 may be fabricated by integrating the wheel main body 102 and the grousers 103. The grousers 103 and/or a part of the wheel main body 102 may be made of elastic body such as rubber, like a tire of an automobile, for example.

Similar to the first embodiment, when a vehicle equipped with the wheel 101 travels on soft ground such as sand, dirt, mud, and a field, as shown in FIG. 9, the wheel 101 rotates in the rotational direction RD. The contact surface 131, which is a surface of the grouser 103 attached to the wheel 101, gradually sinks into the surface of the soft ground by the rotation of the wheel 101. Subsequently, the contact surface 131 gradually emerges from the surface of the soft ground by the rotation of the wheel 101. The grousers 103 having different phases in the rotational direction of the wheel 101 in order to sequentially repeat the operation described above for a single grouser. With the operation of these grousers, the vehicle equipped with the wheel 101 obtains a drawbar pull and moves from the left to the right in FIG. 9.

When traveling on soft ground such as sand, dirt, mud, and a field, the vehicle equipped with the wheel 101 can also obtain a large drawbar pull by a small amount of sinkage from the wheel 101 and further obtain a reduced amount of sinkage of the wheel 101, compared to a vehicle equipped with a wheel of the related art.

Figure 10:
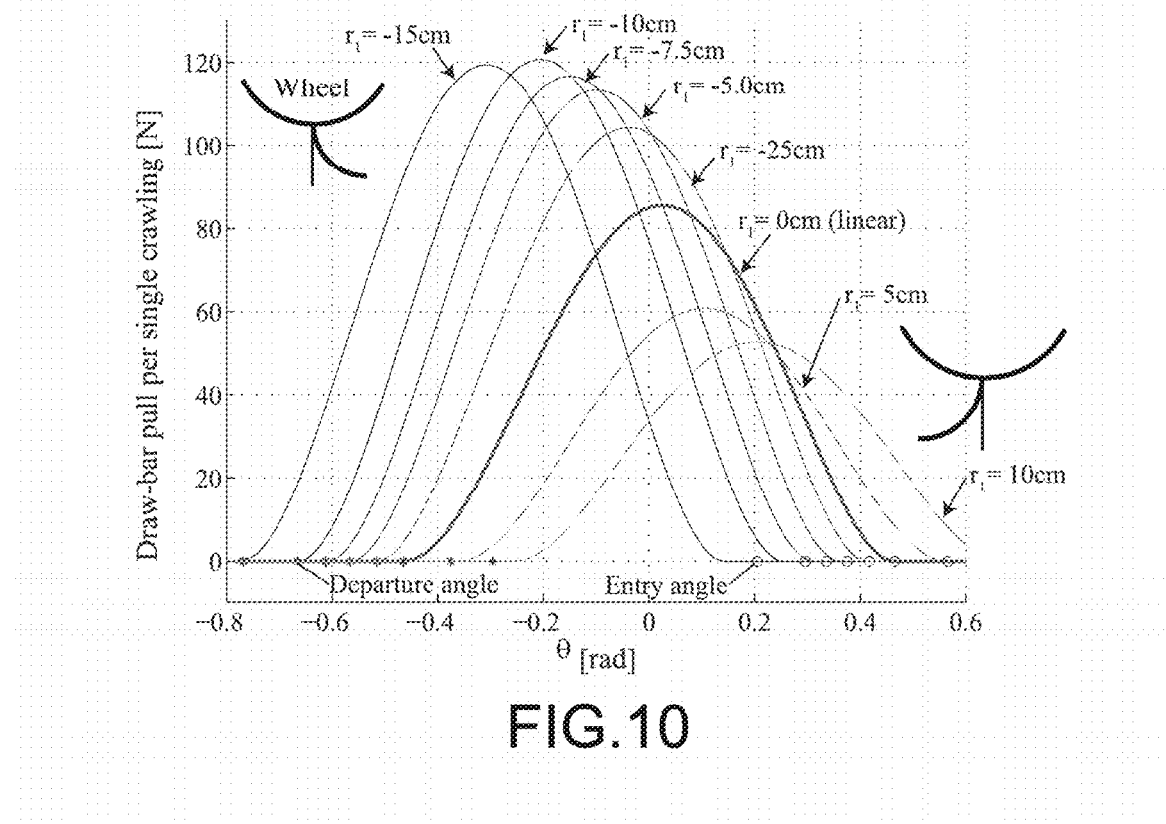
FIG. 10 is a graph showing results of an analysis of a relationship between an inclination angle of an arc-shaped grouser and a drawbar pull of the wheel.
Figure 11:
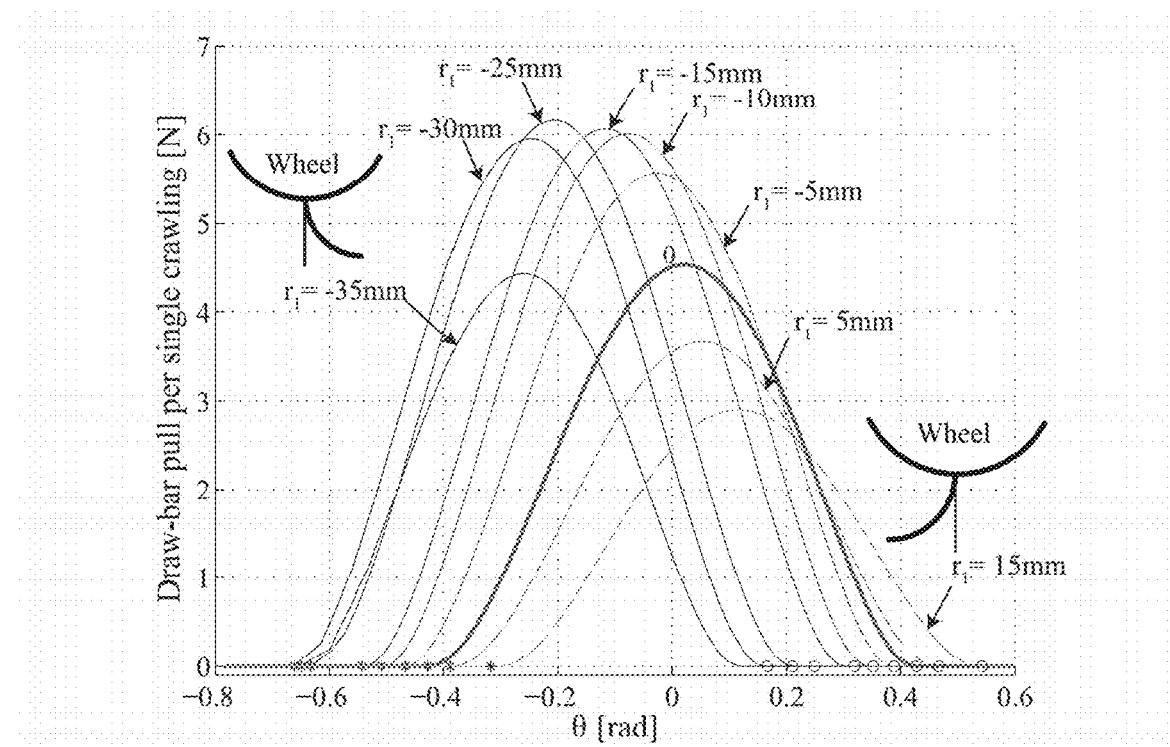
FIG. 11 is a graph showing results of another analysis of the relationship between the inclination angle of the arc-shaped grouser and the drawbar pull of the wheel.

FIGS. 10 and 11 are graphs each showing a relationship between a radius $r_1$ of the arc of the grouser 103 and a drawbar pull of the wheel 101. FIG. 10 shows data for a case where the grouser 103 has a height $h_1$ of 5 cm, and FIG. 11 shows data for a case where the grouser 103 has the height $h_1$ of 10.0 mm. Those values are calculated for one grouser 103 of the wheel 101.

In the x axis of FIGS. 10 and 11, $\theta$(rad) represents an angle defined by the ground and a line connecting the center line CL of the wheel main body 102 and a position where a predetermined grouser 103 is fixed. The entry side of the predetermined grouser 103 to the ground has $\theta$ in a positive value, and the departure side of the predetermined grouser 103 from the ground has $\theta$ in a negative value. The variable $r_1$ represents the size of the radius of the arc of the grouser 103. When the tangent line TD of the contact surface 131 of the grouser 103 is inclined opposite to the rotational direction RD of the wheel main body 102 from the center line CL of the wheel main body 102, the value $r_1$ is negative.

As found from FIGS. 10 and 11, when the radius $r_1$ of the arc of the grouser 103 has a negative value, that is, when the tangent line TD of the contact surface 131 of the grouser 103 is inclined opposite to the rotational direction RD of the wheel main body 102 from the center line CL of the wheel main body 102, peaks of the drawbar pull and integrated values of the drawbar pull are larger than those obtained when the radius $r_1$ has a positive value. When $r_1$ is 10 cm in FIG. 10 and $r_1$ is 25 mm in FIG. 11, that is, when the $r_1/h_1$ ratio is approximately 1, the peak of the drawbar pull and the integrated value of the drawbar pull are maximized.

Figure 12:
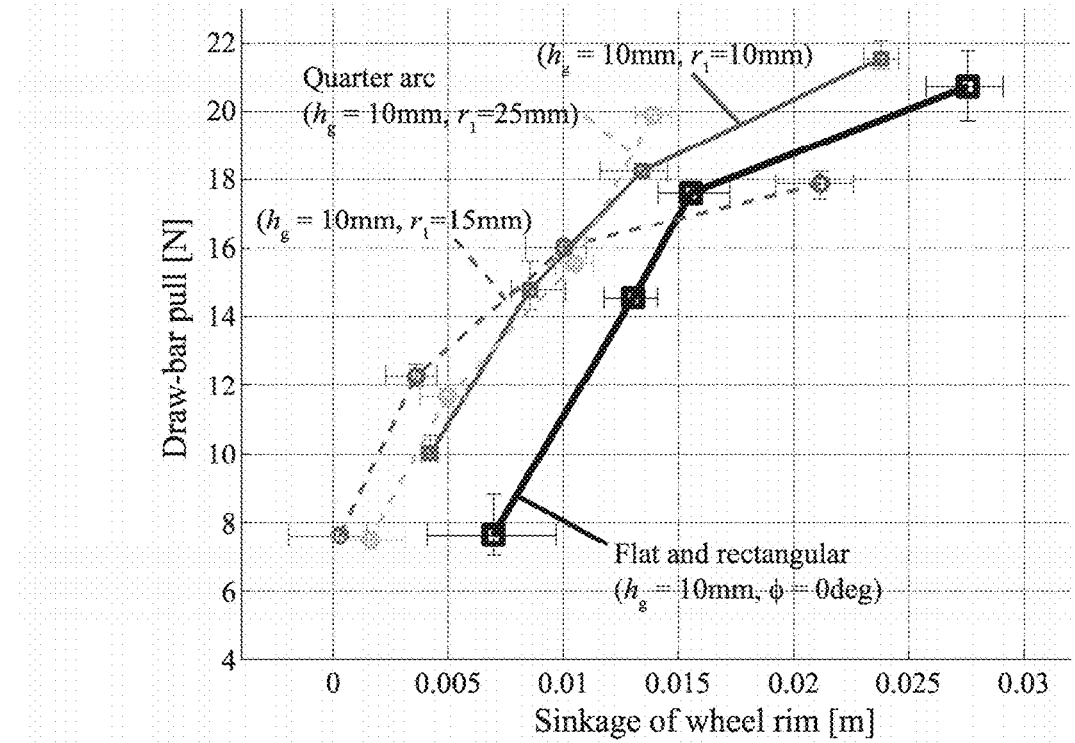
FIG. 12 is a graph showing results of experiments performed to calculate a relationship between the amount of sinkage of the arc-shaped grouser and the drawbar pull of the wheel.

FIG. 12 is a graph showing results of experiments performed to calculate a relationship between the amount of sinkage of the grouser 103 and the drawbar pull of the wheel 101.

In FIG. 12, $h_g$ represents the height of the grouser 103, and $r_1$ represents the size of the radius of the arc of the grouser 103. The tangent line TD of the contact surface 131 of the grouser 103 is inclined opposite to the rotational direction RD of the wheel main body 102 from the center line CL of the wheel main body 102.

In FIG. 12, data referring to "Flat and rectangular ($h_g$=10 mm, $\varphi$=0 deg)" represents a relationship between the amount of sinkage and the drawbar pull of the wheel including a grouser having a height of 10 mm, that is, a relationship between the amount of sinkage and the drawbar pull of a wheel of the related art.

A traverse line at each point represents a range of variations in measurement.

From those measurement results, it is found that the wheel 101 according to the second embodiment of the present disclosure can obtain a larger drawbar pull by a smaller amount of sinkage and obtain a reduced amount of sinkage, compared to a wheel of the related art. Further, similar to the wheel 1 according to the first embodiment, it is found that the wheel 101 according to the second embodiment of the present disclosure can obtain a drawbar pull even when the amount of sinkage is 0.

Figure 13:
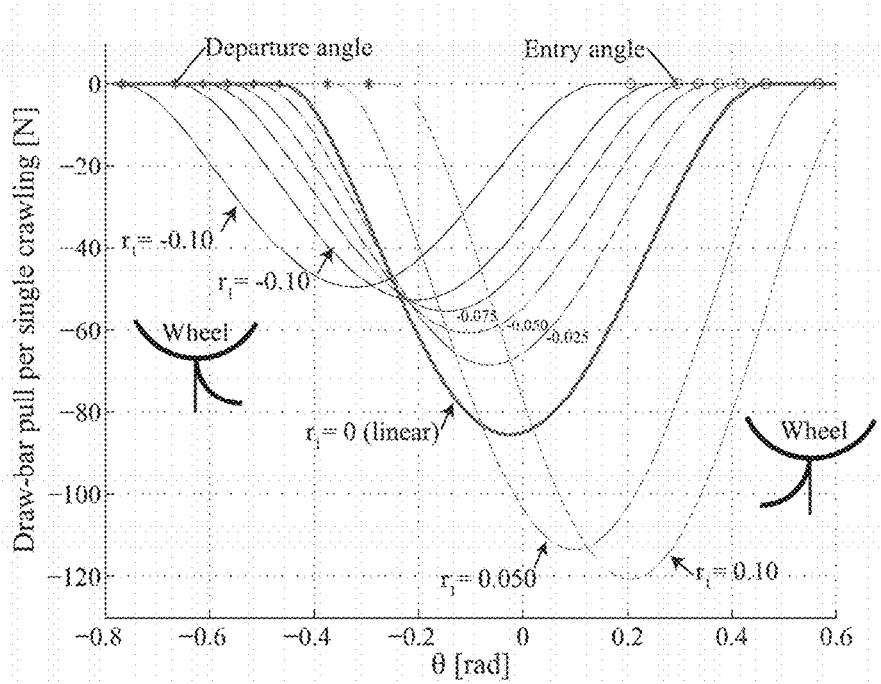
FIG. 13 is a graph showing results of an analysis of a resistance force that the wheel including the arc-shaped grousers receives from the ground through traveling.

FIG. 13 is a graph showing results of an analysis of a resistance force that the wheel 101 receives from the ground through traveling.

In the x axis of FIG. 13, θ(rad) represents an angle defined by the ground and a line connecting the center line CL of the wheel main body 102 and a position where a predetermined grouser 103 is fixed. The entry side of the predetermined grouser 103 to the ground has θ in a positive value, and the departure side of the predetermined grouser 103 from the ground has θ in a negative value.

In FIG. 13, $r_1$ represents the size of the radius of the arc of the grouser 103. When the tangent line TD of the contact surface 131 of the grouser 103 is inclined opposite to the rotational direction RD of the wheel main body 102 from the center line CL of the wheel main body 102, the value $r_1$ is negative.

When the value $r_1$ is negative, that is, in the case of the grouser 103 according to the second embodiment of the present disclosure, it is found that the resistance force that the wheel 101 receives from the ground is small.

Third Embodiment

Figure 14:
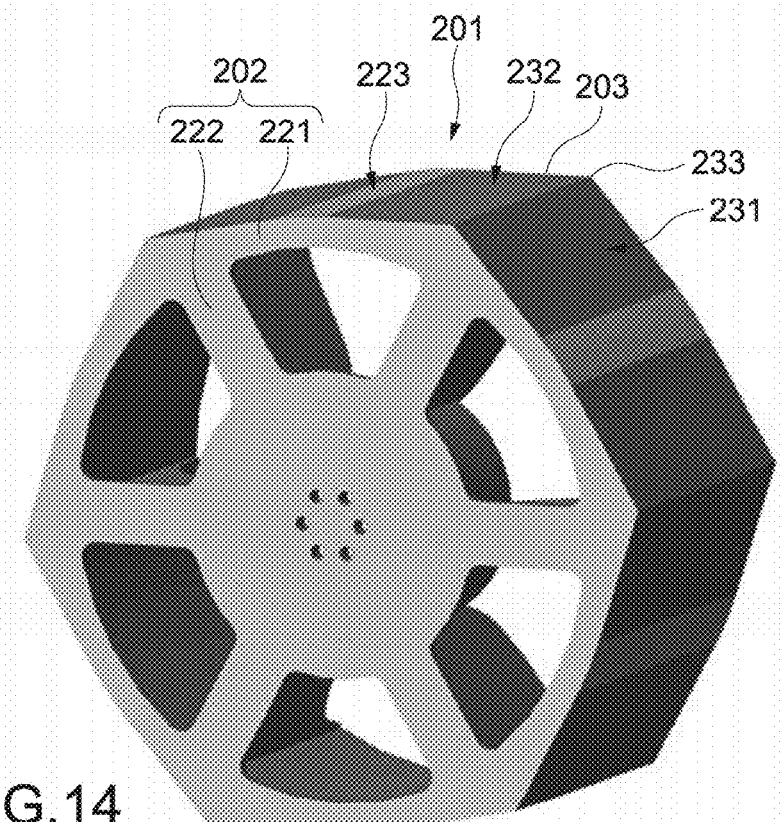
FIG. 14 is a perspective view of a wheel according to a third embodiment of the present disclosure.
Figure 15:
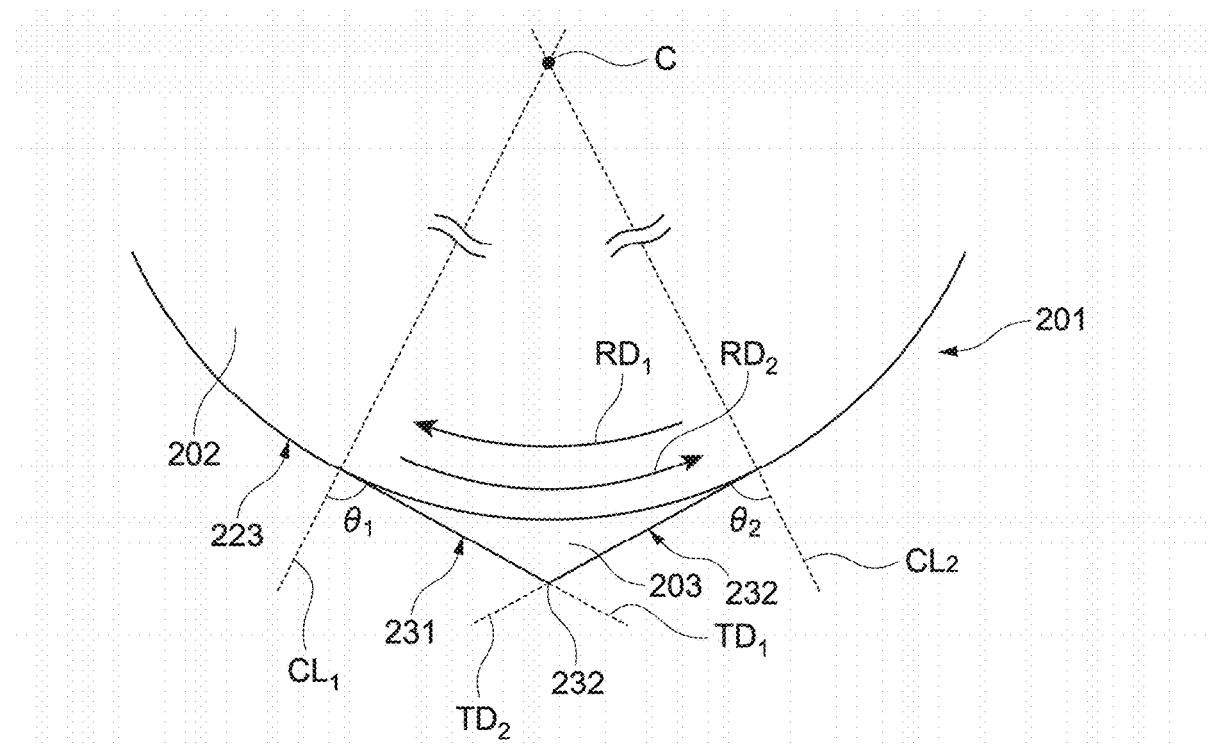
FIG. 15 is a partially enlarged view of the wheel shown in FIG. 14.

FIG. 14 is a perspective view of a wheel according to a third embodiment of the present disclosure. FIG. 15 is a partially enlarged view of the wheel.

As shown in those figures, a wheel 201 includes a circular wheel main body 202 and a plurality of grousers 203.

The wheel main body 202 typically includes a rim 221 and a plurality of spokes 222.

The grousers 203 are located along an outer circumference 223 of the wheel main body 202 typically at predetermined intervals. The number of grousers 203 can be 6, for example. However, the number of grousers 203 is not limited thereto. In some embodiments, each of the grousers 203 has substantially the same shape and size.

Each of the grousers 203 is provided along the outer circumference 223 of the wheel main body 202 and has a first contact surface 231 and a second contact surface 232.

The first contact surface 231 can draw a first tangent line $TD_1$ that is inclined opposite to a first rotational direction $RD_1$ of the wheel main body 202 from a center line $CL_1$ of the wheel main body 202. The second contact surface 232 can draw a second tangent line $TD_2$ that is inclined opposite to a second rotational direction $RD_2$ from a center line $CL_2$ of the wheel main body 202. The second rotational direction $RD_2$ is a direction opposite to the first rotational direction $RD_1$. The first contact surface 231 and the second contact surface 232 are typically rectangular surfaces. Each of the grousers 203 comprises, in some embodiments, a linear ridge line 233 at which the first contact surface 231 and the second contact surface 232 intersect with each other. Each of the grousers 203 can comprise a projection member having the first contact surface 231 and the second contact surface 232 with the ridge line 233 therebetween.

An angle $\theta_1$ defined by the center line $CL_1$ of the wheel main body 202 and the first contact surface 231 and an angle $\theta_2$ defined by the center line $CL_2$ of the wheel main body 202 and the second contact surface 232 can be approximately 90 degrees. However, the angles $\theta_1$ and $\theta_2$ may be, in some embodiments, between 10 degrees and 90 degrees. The angles $\theta_1$ and $\theta_2$ may have the same value angle or different values. When angles $\theta_1$ and $\theta_2$ have different values, different performances can be exerted in different traveling directions.

In several embodiments, the wheel main body 202 and the grousers 203 are substantially rigid, but may be made of elastic body such as rubber, similarly to the wheels according to other embodiments as described above.

When a vehicle equipped with the wheel 201 travels in one direction on soft ground such as sand, dirt, mud, and a field, as shown in FIG. 15, the wheel 201 rotates in the first rotational direction $RD_1$. The first contact surface 231, which is a flat of the grouser 203 of the wheel 201, gradually sinks into the surface of the soft ground by the rotation of the wheel 201. Subsequently, the first contact surface 231 gradually emerges from the surface of the soft ground by the rotation of the wheel 201. The grousers 203, having different phases in the rotational direction of the wheel 201, can sequentially repeat the operation described above for one grouser. With this operation, the vehicle equipped with the wheel 201 obtains a drawbar pull and moves from the left to the right in FIG. 15.

When the vehicle equipped with the wheel 201 travels in the other direction on the soft ground, as shown in FIG. 15, the wheel 201 rotates in the second rotational direction $RD_2$. The second contact surface 232, which is the other flat of the grouser 203 of the wheel 201, gradually sinks into the surface of the soft ground by the rotation of the wheel 201. Subsequently, the second contact surface 232 gradually emerges from the surface of the soft ground by the rotation of the wheel 201. The grousers 203, having different phases in the rotational direction of the wheel 201, can sequentially repeat such the operation described above for one grouser. With this operation, the vehicle equipped with the wheel 201 obtains a drawbar pull and moves from the right to the left in FIG. 15.

When traveling forward and backward on the soft ground such as sand, dirt, mud, and a field, the vehicle equipped with the wheel 201 can obtain a large drawbar pull by a small amount of sinkage from the wheel 201 in any traveling direction and further obtain a reduced amount of sinkage of the wheel 201, compared to a vehicle equipped with a wheel as described in the literature.

Fourth Embodiment

Figure 16:
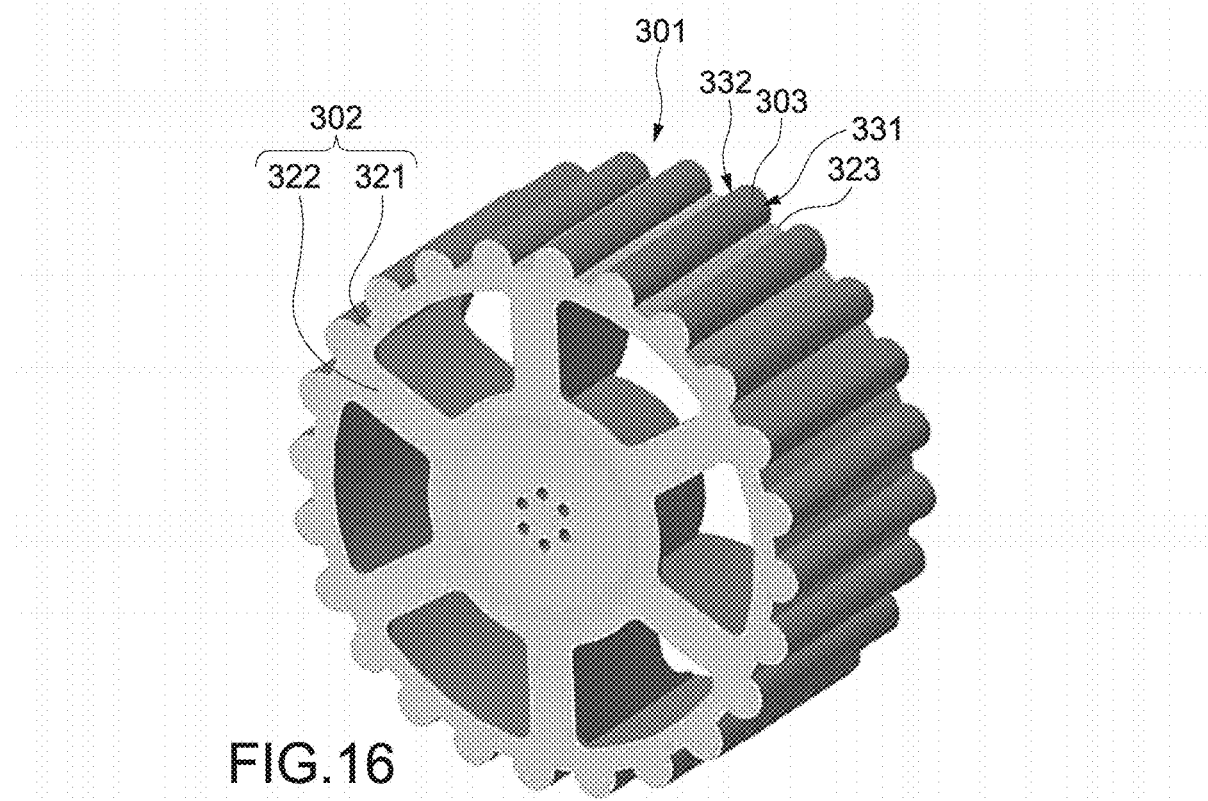
FIG. 16 is a perspective view of a wheel according to a fourth embodiment of the present disclosure.
Figure 17:
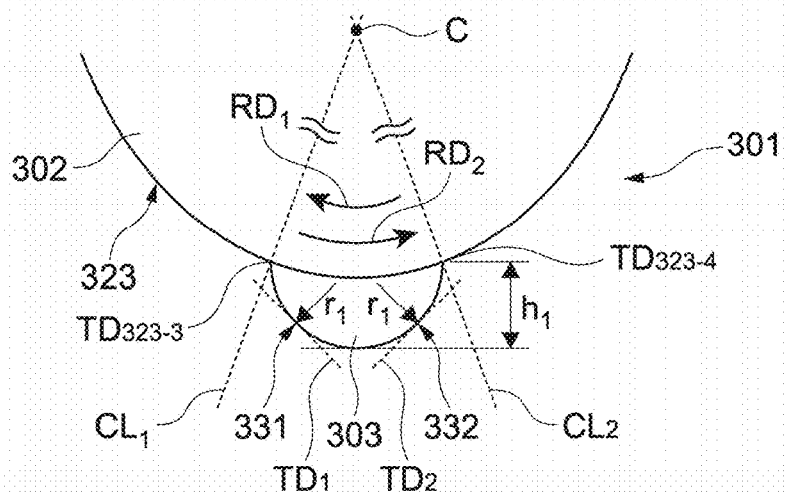
FIG. 17 is a partially enlarged view of the wheel shown in FIG. 16.

FIG. 16 is a perspective view of a wheel according to a fourth embodiment of the present disclosure. FIG. 17 is a partially enlarged view of the wheel of FIG. 16.

As shown in FIGS. 16 and 17, a wheel 301 comprises a circular wheel main body 302 and a plurality of grousers 303.

The wheel main body 302 typically comprises a rim 321 and a plurality of spokes 322.

The grousers 303 are located along an outer circumference 323 of the wheel main body 302 typically at predetermined intervals. The number of grousers 303 can be 30, for example. However, the number of grousers 303 is not limited thereto. Each of the grousers 303 can have substantially the same shape and size.

Each of the grousers 303 can be located along the outer circumference 323 of the wheel main body 302 and is constituted by a half columnar member in which a first contact surface 331 and a second contact surface 332 are continuous. In other word, the member has a shape substantially equal to half of a cylinder. The first contact surface 331 and the second contact surface 332 each have a shape of about a quarter arc. The first contact surface 331 can draw a first tangent line $TD_1$ that is inclined opposite to a first rotational direction $RD_1$ of the wheel main body 302 from a center line $CL_1$ of the wheel main body 302. The second contact surface 332 can draw a second tangent line $TD_2$ that is inclined opposite to a second rotational direction $RD_2$ from a center line $CL_2$ of the wheel main body 302. The second rotational direction $RD_2$ is a direction opposite to the first rotational direction $RD_1$. The first contact surface 331 and the second contact surface 332 can be symmetric. However, when the first contact surface 331 and the second contact surface 332 have different shapes, and are therefore not symmetric, different performances can be exerted in different traveling directions.

The center lines $CL_1$ and $CL_2$ of the wheel main body 302 can coincide with a third tangent line $TD_{323-3}$ and a fourth tangent line $TD_{323-4}$ of the grouser 303, respectively, the grouser 303 being the half columnar member at a position on the outer circumference 323 of the wheel main body 302.

When a height of the grouser 303 serving as the half columnar member in the direction of each of the center lines $CL_1$ and $CL_2$ of the wheel main body 302 is denoted as $h_1$ and a radius of the arc-shaped first contact surface 331 and second contact surface 332 is denoted as $r_1$, the following expression can be satisfied:

$$0.5 \le r_1/h_1 \le 3.$$

In some embodiments, the $r_1/h_1$ ratio is approximately 1.

Typically, the wheel main body 302 and the grousers 303 are substantially rigid, but a part or all of the wheel 301 may be made of elastic body such as rubber, similarly to the wheels according to the above embodiments.

When a vehicle equipped with the wheel 301 travels in one direction on soft ground such as sand, dirt, mud, and a field, as shown in FIG. 17, the wheel 301 rotates in the first rotational direction $RD_1$. The first contact surface 331, which is a surface of the grouser 303 of the wheel 301, gradually sinks into the surface of the soft ground by the rotation of the wheel 301. Subsequently, the first contact surface 331 gradually emerges from the surface of the soft ground by the rotation of the wheel 301. The grousers 303, having different phases in the rotational direction of the wheel 301, can sequentially repeat the operation described above for one grouser. With this operation, the vehicle equipped with the wheel 301 obtains a drawbar pull and moves from the left to the right in FIG. 17.

When the vehicle equipped with the wheel 301 travels in the other direction on the soft ground, as shown in FIG. 17, the wheel 301 rotates in the second rotational direction $RD_2$. The second contact surface 332, which is the other flat of the grouser 303 of the wheel 301, gradually sinks into the surface of the soft ground by the rotation of the wheel 301. Subsequently, the second contact surface 332 can gradually emerge from the surface of the soft ground by the rotation of the wheel 301. The grousers 303, having different phases in the rotational direction of the wheel 301, can sequentially repeat the operation described above for one grouser. With this operation, the vehicle equipped with the wheel 301 obtains a drawbar pull and moves from the right to the left in FIG. 17.

When traveling forward and backward on the soft ground such as sand, dirt, mud, and a field, the vehicle equipped with the wheel 301 can obtain a large drawbar pull by a small amount of sinkage from the wheel 301 in any direction and further obtain a reduced amount of sinkage of the wheel 301, compared to a vehicle equipped with a wheel of the related art.

Fifth Embodiment

Figure 18:
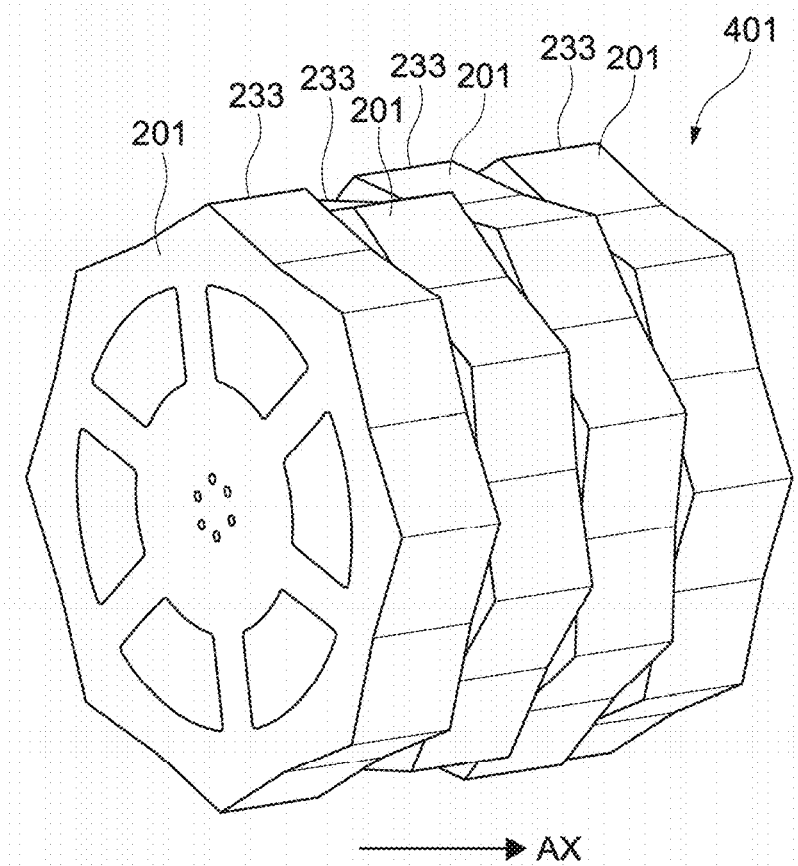
FIG. 18 is a perspective view of a wheel system according to a fifth embodiment of the present disclosure.

FIG. 18 is a perspective view of a wheel system according to a fifth embodiment of the present disclosure.

As shown in FIG. 18, a wheel system 401 can comprise four wheels 201 having the same shape as the wheel 201 shown in FIG. 14, which are disposed such that the axes of the wheels 201 are coaxial. The number of wheels 201 is not limited to four and may be more than one.

The wheel according to this embodiment may comprise a circular wheel main body and a plurality of grousers, the grousers being located along an outer circumference of the wheel main body and having a first contact surface and a second contact surface. The first contact surface can draw a first tangent line that is inclined opposite to a first rotational direction of the wheel main body from a first center line of the wheel main body. The second contact surface can draw a second tangent line that is inclined opposite to a second rotational direction from a second center line of the wheel main body. The second rotational direction is a direction opposite to the first rotational direction. The wheel 301 shown in FIG. 16 may be used instead of the wheel 201. The wheel system according to this embodiment may use wheels having different forms in combination. For example, any of the wheels and grousers described in the present disclosure may be used in different combinations.

The wheels 201 can each have an equal number of ridge lines 233, such as 6, for example.

The wheels 201 are disposed such that positions of the ridge lines 233 of the wheels 201 in an axial direction AX of the wheels 201 do not coincide with the positions of the ridge lines 233 of the adjacent wheels 201 in the axial direction AX of the wheels 201. When traveling forward and backward on the soft ground such as sand, dirt, mud, and a field, the vehicle equipped with the wheel system 401 can obtain a large drawbar pull by a small amount of sinkage almost in proportion to the number of wheels 201 from the wheel system 401 in any direction and further obtain a reduced amount of sinkage of the wheel 201, compared to a vehicle equipped with a wheel of the related art.

Conclusions

According to the embodiments described herein, the following effects of the present disclosure can be obtained.

Compared to a wheel having flat projections of the related art, improvement in drawbar pull with respect to an arbitrary amount of sinkage was experimentally confirmed: the wheel according to the first embodiment has 30% to 200% of improvement in performance; and the wheel according to the second embodiment has 10% to 100% of improvement in performance. Therefore, a large drawbar pull can be produced by a small amount of sinkage.

The amount of sinkage can be smaller by the same amount of slip.

Since the amount of sinkage is small, traveling efficiency is improved.

Since the wheels according to the embodiments of the present disclosure exhibit optimal characteristics among wheel shapes within the same acceptable envelope, a drawbar pull per mass and volume is large.

When soil properties are different, optimal characteristics can be exhibited similarly. Specifically, the characteristics are not dependent on the soil properties.

Another Form of Grouser

The grousers according to the embodiments of the present disclosure may have various forms as follows except for the forms shown in the embodiments described above.

Figure 19:
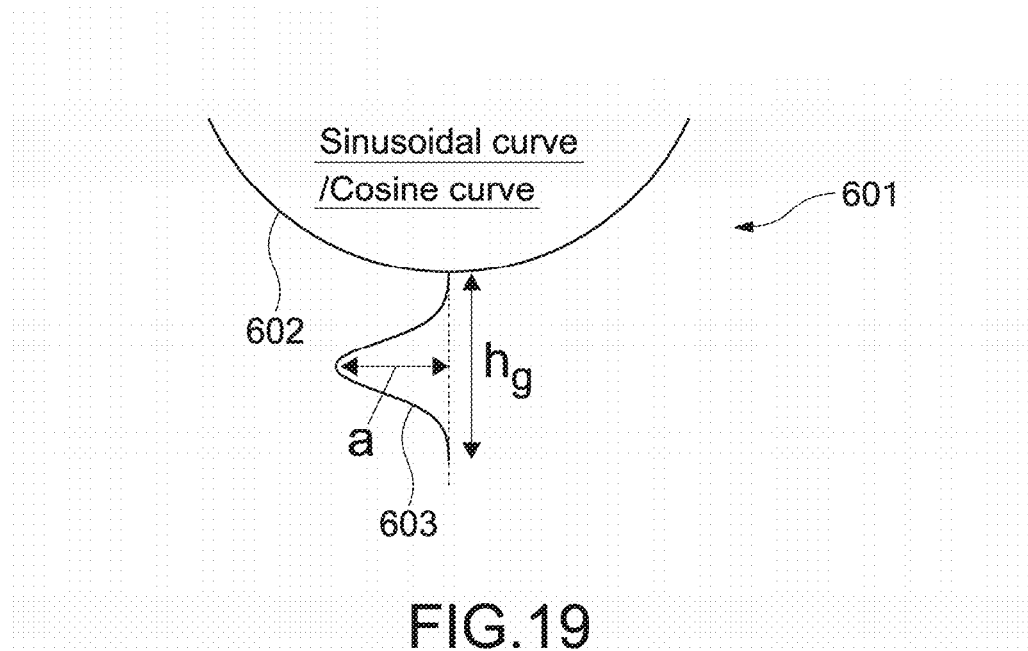
FIG. 19 is a schematic view of another grouser form according to one embodiment of the present disclosure.

For example, a wheel 601 shown in FIG. 19 includes a wheel main body 602 and sinusoidal/cosine shaped grousers 603 located on the wheel main body 602.

Figure 20:
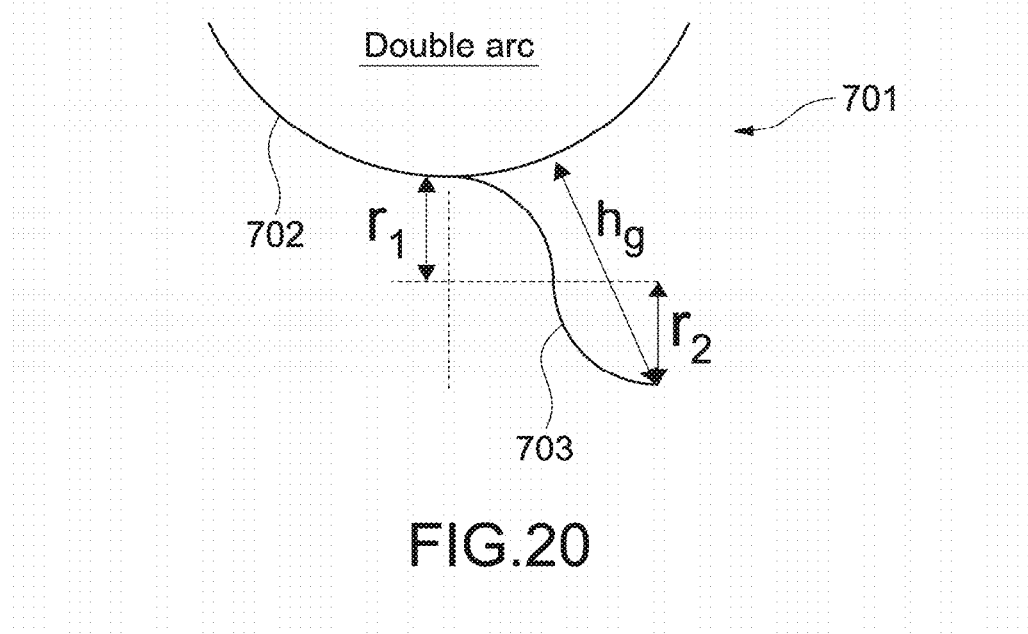
FIG. 20 is a schematic view of still another grouser form according to one embodiment of the present disclosure.

For example, a wheel 701 shown in FIG. 20 includes a wheel main body 702 and grousers 703 located on the wheel main body 702, the grousers 703 each including two arcs inversely combined.

In other words, the grouser according to one embodiment of the present disclosure can have a contact surface capable of drawing a first tangent line, the first tangent line being inclined opposite to the rotational direction of the wheel main body from a center line of the wheel main body.

The wheels and wheel system according to the embodiments of the present disclosure are typically used for a projecting form of a metal wheel surface of a traveling mechanism in a vehicle for planetary exploration or a robot.

The wheels and wheel system according to the embodiments of the present disclosure can be used for various applications in addition to the above application.

Application Field of the Present Disclosure

The present disclosure is applicable to various fields as exemplified below.

The wheels and wheel system according to the embodiments of the present disclosure can be used for a rubber tire form of a traveling mechanism of a mechanical vehicle for construction and engineering, for example.

The wheels and wheel system according to the embodiments of the present disclosure can be used for a form with which a large reaction force is acquired from a medium deformed by an action of a traveling mechanism, such as water and granular media.

The wheels and wheel system according to the embodiments of the present disclosure can be used for a puddle-blade form such as a puddle wheel of a ship, for example.

The wheels and wheel system according to the embodiments of the present disclosure can be used for a form of a contact part of an agitator for granular materials, for example.

Results of Analytical Calculation of Optimization

As described herein, the present disclosure describes the design of optimal grouser shapes of a wheel surface on the basis of a sinkage-pressure relational expression experimentally calculated, which is called Resistive Force Theory (see, Li, C., Zhang, T., and Goldman, D. I. (2013). A terradynamics of legged locomotion on granular media. Science, 339: 1408-1412, the disclosure of which is incorporated herein by reference in its entirety).

As a result of the analytical calculation of optimization, which is based on the calculus of variations, the best result was derived when the grouser shape was varied depending on a rotational angle. However, it amy not be practical to vary the grouser shape depending on the rotational angle. In this regard, a linear optimization calculation can be performed, so that the grouser shape is the same as the shape used for the Buchanan's puddle wheel, the Morgan wheel, and similar configuration. The present disclosure further describes the calculation for optimization of the grousers, verifying different grouser shapes, as described in the present disclosure.

In the following, the results of the analytical calculation of optimization will be described. Although the following calculations are performed with specific assumptions or limitations, the actual embodiments of the wheels and grousers of the present disclosure may be different that those used in the calculations. The following assumptions or limitations can be considered examples for embodiments of the present disclosure.

To optimize a grouser shape function, g(q), a simplified equation is as follows.

$$f_{grouser} = \int_{\theta_{rg}}^{\theta_{fg}} \int_{q_\varepsilon}^{q_f} \alpha(\beta, \gamma) w(q) \qquad (33)$$

$$\{[R+q]\cos\theta + g(q)\sin\theta - [R-z_{max}]\}\sqrt{1 + \left[\frac{dg(q)}{dq}\right]^2}\, dq d\theta,$$

where w(q) denotes a wheel width along coordinate axis, and q equals b for a constant wheel width. A wheel radius, R, is assumed to be constant here, and a cross-wheel pattern, s(r), is flat.

In the following, optimization of a drawbar pull from a single grouser is considered. In addition, for a wheel with large grousers, since the interaction primarily occurs between the grousers and the terrain rather than the rim of the wheel, it is assumed that the surface level of the terrain in front and rear of the grouser shape of the wheel is identical and $z_{max}=0$. This is a reasonable assumption for a wheel with large grousers, because such wheels do not exhibit the same bulldozing effect as wheels with small or no grousers.

To optimize the grouser shape for the maximum drawbar pull, the calculus of variations using the following Euler's equation for the grouser is used.

$$\frac{\partial f_{grouser}}{\partial g} - \frac{d}{dq}\left(\frac{\partial f_{grouser}}{\partial g'}\right) - \frac{d}{d\theta}\left(\frac{\partial f_{grouser}}{\partial g_\theta}\right) = 0 \qquad (34)$$

where g' denotes the derivative of g, and the subscript in gθ denotes the derivative of θ.

The solutions to the above equation provide the minimum, maximum, and inflection points. Therefore, those solutions may not guarantee global optimality.

In the following, the case of a grouser with a flat and rectangular shape will be considered.

The case of a flat and rectangular grouser is considered, where g''=0 but the angle of the flat grouser can be varied. Two cases are considered: (a) a first case where, when a spatial derivative of the shape of the grouser is independent of soil properties, the derivative of α at g' is obtained, that is, the following expression is established:

$$\frac{\partial \alpha}{\partial g'} = 0$$

and (b) a second case where the above derivative is dependent on soil properties.

Substituting the equation (33) into the equation (34) and solving those Euler equations yields the optimal grouser shape expressions for the given assumptions. Equations (56) to (76) described below show the solutions to the soil independent case, and equations (77) to (96) described below show the solutions to the soil dependent case. The optimal grouser shape for the soil independent case (a) is given by:

$$g' = \tan \theta \quad (35)$$

When the derivative is dependent on the soil properties (case (b)), i.e., the following expression is established:

$$\frac{\partial \alpha}{\partial g'} \neq 0$$

the optimal shape is given by:

$$\frac{\alpha_d g' - \alpha}{\alpha_d + \alpha g'} \tan\theta + 1 = 0 \quad (36)$$

where the derivative of α at g' is given by:

$$\frac{\partial \alpha}{\partial g'} = \frac{\alpha_d}{1 + g'^2}, \quad (37)$$

and where $\alpha_d$ is given by:

$$\alpha_d = \quad (38)$$

$$\varsigma \sum_{m=-1}^{1} \sum_{n=0}^{1} (2m-n) \left[ -C_{m,n} \sin 2\pi \left( \frac{m\beta(\theta, g')}{\pi} + \frac{n\gamma(\theta, g')}{2\pi} \right) + D_{m,n} \cos 2\pi \left( \frac{m\beta(\theta, g')}{\pi} + \frac{n\gamma(\theta, g')}{2\pi} \right) \right]$$

In the equation, $C_{m,n}$ and $D_{m,n}$ are the Fourier coefficients described in the above-mentioned Resistive Force Theory (Li, C., Zhang, T., and Goldman, D. I. (2013). A terradynamics of legged locomotion on granular media. Science, 339:1408-1412.). It is supposed that $C_{m,n} \rightarrow A_{m,n}$ and $D_{m,n} \rightarrow B_{m,n}$ for the calculation of the force in z direction.

The second order derivative of α at g', $\alpha_{dd}$, is given by:

$$\frac{\partial \alpha_d}{\partial g'} = \frac{\alpha_{dd}}{1 + g'^2}, \quad (39)$$

where the following expression is obtained:

$$\alpha_{dd} = \quad (40)$$

$$\varsigma \sum_{m=-1}^{1} \sum_{n=0}^{1} -(2m-n)^2 \left[ C_{m,n} \cos 2\pi \left( \frac{m\beta(\theta, g')}{\pi} + \frac{n\gamma(\theta, g')}{2\pi} \right) + D_{m,n} \sin 2\pi \left( \frac{m\beta(\theta, g')}{\pi} + \frac{n\gamma(\theta, g')}{2\pi} \right) \right]$$

While the parameters $\alpha_d$ and $\alpha_{dd}$ include a scaling factor, ζ, which defines soil properties in the solution of the optimal shapes for both the soil dependent case and the soil independent case expressed by the equations (35) and (36), ζ cancels out. Therefore, the optimal shape for the flat grouser turns out to be independent of the scaling factor.

To calculate the optimal shape for the flat rectangular grouser with an inclination angle of φ from the coordinate axis, q, the following equation is used.

$$g = a_\phi q, \frac{dg}{dq} = a_\phi, a_\phi = \tan\phi, q_f = h_g \cos\phi \quad (41)$$

where the grouser length is constrained to $h_g$, and the starting point of the submerged grouser, $q_s$, is given by:

$$q_s = \frac{q_z}{1 + a_\phi \tan\theta} \quad (42)$$

Solving the equations (35) and (36) respectively for the above constraints yield the following results:

$$\varphi = \theta, \quad (43)$$

and $$\varphi = \theta - 0.16 \text{ rad}. \quad (44)$$

FIGS. 3, 9, 19, and 20 show the grouser shapes that are considered and numerically verified in terms of the maximum drawbar pull, its integrated value, the maximum drawbar pull per grouser length, and resistance from soil. In the case of a wheel-bound diameter, the grouser length can be further increased for higher inclination grouser angles as shown in FIGS. 3, 9, 19, and 20. Here, it is assumed that the entire grouser is within a bounding circle having the radius of $R+h_g$ where the maximum grouser length, $l_{max}$, for a given inclination, φ, is given by:

$$l_{max} = -R \cos \varphi + \sqrt{h_g^2 + 2h_g R + R^2 \cos^2 \varphi} \quad (45)$$

FIGS. 4 and 5 show the results of the case of the wheel-bound diameter. In this case, the flat rectangular grouser with φ=−90 degrees generates the largest drawbar pull and subsequently the largest integrated value. Those results are expected because the grouser length is dominant in the equation (33) (deeply depends on the grouser length, not on $\varphi(\beta,\gamma)$). In summary, for the flat rectangular grouser, an analytical model shows that an inclination $\varphi=-90$ degrees is the numerically optimal solution for a diameter-bound case, while an inclination $\varphi=0+0.16$ rad is the optimal one for the grouser-length-restricted case.

Next, the case of an arc-shaped grouser will be considered. Once again, here, both the soil independent case and the soil dependent case are considered. For the former, the following expression is established:

$$\frac{\partial \alpha}{\partial g'} = 0$$

and $g''\neq 0$. Consequently, the optimal condition for the curved grouser in this case is given by (see the equations (56) to (76) described below for derivation):

$$\frac{1 + g'^2 - gg''}{g'(1 + g'^2) + g''(q - q_z)}\tan\theta - 1 = 0 \qquad (46)$$

For the soil dependent case, the following expression is established:

$$\frac{\partial \alpha}{\partial g'} \neq 0$$

and $g''\neq 0$. The optimal condition is given by (see the equations (77) to (96) described below for derivation):

$$\frac{\alpha_{dd}gg'' + \alpha_d g'(1 + g'^2) - \alpha(1 + g'^2 - gg'')}{\alpha_{dd}g''(q - q_z) + \alpha_d(1 + g'^2) + \alpha[g'(1 + g'^2) + g''(q - q_z)]}\tan\theta + 1 = 0. \qquad (47)$$

Similarly to the results from the flat and rectangular grouser case in the previous paragraphs, the optimal conditions in the equations (46) and (47) are independent of a difference in scaling factors. Although those conditions provide analytical solutions at the minimum, maximum, or inflection point, the solutions cannot guarantee global optimality.

Since it can be difficult to solve those equations algebraically, the optimal shape function, g, was calculated numerically, but the part of the grouser could not be obtained. Especially, in the case where the soil properties are considered, the grouser shape almost does not appear because of appearance of a complex number in the solution.

From those results, the optimal drawbar pull points to shapes that can be approximated with quarter arcs or ellipses but are dependent on the rotational angle, $\theta$. Since it is not practical to design grousers with variable shapes, grousers with fixed shapes that have near-optimal performance are considered instead. A parameterized quarter arc shape is investigated with $r_1$ and $r_2$ for the semi-major and semi-minor axes of a grouser. The diameter increase is restricted to $h_g$ for the wheel with the grousers as shown in FIGS. 3, 9, 19, and 20. The following equation describes a relationship of $r_1$, $r_2$, and $h_g$;

$$r_2 = -R + \sqrt{(R+h_g)^2 - r_1^2}; \qquad (48)$$

The shape of the grouser is given by:

$$g = r_1\left(1 - \sqrt{1 - \frac{q^2}{r_2^2}}\right), \frac{dg}{dq} = \frac{r_1 q}{r_2^2\sqrt{1 - \frac{q^2}{r_2^2}}}, w = b, \frac{dw}{dq} = 0. \qquad (49)$$

FIG. 10 shows that the results of the drawbar pull are independent of the wheel parameters. For quarter arcs where $r_1 \geq r_2$ and where convex parts move toward the soil surface during entry, the drawbar pull per unit length of the grouser shows higher performance than the flat and rectangular grousers having an equal length and being mounted perpendicular to the wheel main body. The latter grouser also has a higher likelihood of resulting in waking mobility.

Next, optimization of the grouser width will be described. It can be intuitive that a full-width grouser across its entire length, $w(q)=b$, will maximize the contact with the surface and generate the maximum drawbar pull. This is analytically verified by considering the soil independent case defined in the previous paragraphs, where $g''\neq 0$ and the following equation is established:

$$\frac{\partial \alpha}{\partial g'} = 0$$

Considering variations in grouser width along the grouser length for that case, the following equation is obtained.

$$\frac{1 + g'^2 - gg'' - \frac{w'}{w}gg'[1 + g'^2]}{\left(1 + (q - q_z)\frac{w'}{w}\right)g'[1 + g'^2] + (q - q_z)g''}\tan\theta - 1 = 0. \qquad (50)$$

where w denotes the grouser width, and w' is the derivative of w with respect to q. If $g''\neq 0$, the optimal condition reduces to:

$$\frac{w'}{w} = \frac{\tan\theta - g'}{g'(q - q_z) + gg'\tan\theta}, \qquad (51)$$

For a rectangular and inclined grouser with an inclination angle of $\varphi$, the inclination of the grouser shall satisfy the optimal condition, $\varphi=\theta$ and $g'=\tan\varphi$. The resultant optimal condition for the grouser width function simplifies to:

$$\frac{w'}{w} = 0 \qquad (52)$$

Therefore, this case shows that a grouser with a constant width is one of the optimal solutions for maximizing the drawbar pull.

If $g''\neq 0$, a solution for the equation (50) would not be uniquely obtained.

Next, model results for different grousers are compared. First, to verify its correctness, a model was applied to another grouser, and the results were compared to those published by the Resistive Force Theory (Li, C., Zhang, T., and Goldman, D. I. (2013). A terradynamics of legged locomotion on granular media. Science, 339:1408-1412, the disclosure of which is incorporated herein by reference in its entirety). Using wheel/soil parameters shown in FIGS. 3, 9, 19, and 20, the drawbar pull by the half arc was compared, which is defined by the grouser height, $h_g$, and a parabolic parameter, a, and is the same shape used by the Resistive Force Theory (Li, C., Zhang, T., and Goldman, D. I., 2013, A terradynamics of legged locomotion on granular media. Science, 339:1408-1412, the disclosure of which is incorporated herein by reference in its entirety). The grouser shape function g is defined as follows:

$$g = aq(q - h_g), \frac{dg}{dq} = a(2q - h_g), w = b, q_f = h_g. \quad (53)$$

The profile of $q_s$ is expressed as follows:

$$q_s = -\frac{1}{2}\left(\frac{1}{a\tan\theta} - h_g\right) + \text{sign}(a\theta)\sqrt{\frac{q_z}{a\tan\theta} + \frac{1}{4}\left(\frac{1}{a\tan\theta} - h_g\right)^2}, \quad (54)$$

where sign(•) is a sign function.

Similarly, other grouser shapes that include a half-sinusoidal wave and double quarter arcs are defined. Tables 1 and 2 summarize the results of the maximum drawbar pull and its corresponding integrated value over all the rotational angles for all the grouser shapes.

From the results of Tables 1 and 2, as also shown in FIGS. 10 and 11, the grouser with quarter arcs can show superior performance, compared to the other grousers with the exception of a long flat grouser ($\varphi=-89$ degrees) in a tangential direction of the wheel main body. The results from those parabolic curved shapes are similar to those found in the Resistive Force Theory (Li, C., Zhang, T., and Goldman, D. I. (2013). A terradynamics of legged locomotion on granular media. Science, 339:1408-1412, the disclosure of which is incorporated herein by reference in its entirety); it shows that when the convex grouser comes into contact with the ground surface, the drawbar pull is larger than that of a flat radial grouser. However, the flat tangential grouser with the greatest length within a diameter bound exhibits the best performance in terms of the drawbar pull but not in terms of the drawbar pull per unit length of the grouser. Since longer grousers would result in a larger wheel mass, alternate designs that maximize the drawbar pull while minimizing the wheel mass, such as the convex arcs, would earn serious consideration in the design of wheels for planetary exploration. Such a shape can generate a larger drawbar pull without requiring a very long grouser.

Here, the derivation process of the above equation (46) is shown as follows. Consider the following Euler equation (56) for the optimization of the grouser shape to maximize the entire drawbar pull calculated by the equation (57).

TABLE 1

| Type | Grouser shape | Limit | Max DP N | Integ. value Nrad | DP/m kN/m | Max. Res. N |
|---|---|---|---|---|---|---|
| Flat and rectangular | Normal fixed flat grouser($\varphi$ = 0 deg) | Length | 85.5 | 42.1 | 1.71 | −85.5 |
| | Optimal without considering soil feature | | 85.0 | 44.4 | 1.70 | −85.0 |
| | Optimal with considering soil feature | | 89.2 | 46.3 | 1.78 | −76.8 |
| | Inclined fixed grouser ($\varphi$ = −10 deg) | | 89.4 | 43.7 | 1.79 | −77.2 |
| | Inclined fixed grouser ($\varphi$ = −89 deg) | Height | 126 | 62.0 | 0.620 | −54.1 |
| Curved | Quarter arc ($r_1$ = −5 cm) | | 113 | 56.6 | 1.40 | −60.8 |
| | Quarter arc ($r_1$ = −10 cm) | | 121 | 58.8 | 0.987 | −52.6 |
| | Inverse quarter arc ($r_1$ = 5 cm) | | 60.8 | 29.4 | 0.754 | −113 |
| | Sinusoidal curve (a = −0.025) | | 90.2 | 44.9 | 0.945 | −90.2 |
| | Parabolic curve (a = −0.025/0.025) | | 108/72.0 | 53.8/34.1 | 1.38/0.916 | −71.9/−108 |
| | Double quarter arc ($r_1$ = $r_2$) | | 102 | 50.8 | 1.37 | −68.2 |

*DP—Draw-bar Pull, Integ—Integrated, DP/m—DP per unit length, Res—Resistance from soil

TABLE 2

| Type | Grouser shape | Limit | Max DP N | Integ. value Nrad | DP/m kN/m | Max. Res. N |
|---|---|---|---|---|---|---|
| Flat and rectangular | Normal fixed flat grouser($\varphi$ = 0 deg) | Length | 4.65 | 2.11 | 0.465 | −4.65 |
| | Optimal without considering soil feature | | 4.63 | 2.21 | 0.462 | −4.63 |
| | Optimal with considering soil feature | | 4.86 | 2.31 | 0.486 | −4.18 |
| | Inclined fixed grouser ($\varphi$ = −10 deg) | | 4.87 | 2.20 | 0.487 | −4.19 |
| | Inclined fixed grouser ($\varphi$ = −89 deg) | Height | 6.92 | 3.14 | 0.157 | −2.92 |
| Curved | Quarter arc ($r_1$ = −10 mm) | | 6.01 | 2.76 | 0.368 | −3.24 |
| | Quarter arc ($r_1$ = −15 mm) | | 6.06 | 2.74 | 0.293 | −2.90 |
| | Quarter arc ($r_1$ = −25 mm) | | 6.16 | 2.73 | 0.211 | −2.58 |
| | Inverse quarter arc ($r_1$ = −15 mm) | | 2.90 | 1.29 | 0.141 | −6.06 |
| | Sinusoidal curve (a = −0.004) | | 4.86 | 2.26 | 0.318 | −4.86 |
| | Parabolic curve (a = −0.004/0.004) | | 5.20/4.19 | 2.42/1.85 | 0.331/0.267 | −4.19/−5.20 |
| | Double quarter arc ($r_1$ = $r_2$) | | 5.46 | 2.49 | 0.363 | −3.64 |

*DP—Draw-bar Pull, Integ—Integrated, DP/m—DP per unit length, Res—Resistance from soil $$\frac{\partial f_{grouser}}{\partial g} - \frac{d}{dq}\left(\frac{\partial f_{grouser}}{\partial g'}\right) - \frac{d}{d\theta}\left(\frac{\partial f_{grouser}}{\partial g_\theta}\right) = 0, \quad (56)$$

$$f_{grouser} = \int_{\theta_{rg}}^{\theta_{fg}} \int_{q_s}^{q_f} \alpha(\beta, \gamma) w(q)$$
$$\{[R+q]\cos\theta + g\sin\theta - [R - z_{max}]\}\sqrt{1 + \left[\frac{dg}{dq}\right]^2} \, dq\, d\theta. \quad (57)$$

If the following equation is established: the parts of the equation (56) are calculated as follows.

$$\frac{\partial \alpha}{\partial g'} = 0$$

$$\frac{\partial f_{grouser}}{\partial g} = \alpha(\beta, \gamma) w \sin\theta \sqrt{1 + g'^2} \quad (58)$$

$$\frac{\partial f_{grouser}}{\partial g'} = \alpha(\beta, \gamma)[(q - q_z)\cos\theta + g\sin\theta] w \frac{g'}{\sqrt{1 + g'^2}} \quad (59)$$

$$\frac{d}{dq}\left(\frac{\partial f_{grouser}}{\partial g'}\right) = \alpha(\beta, \gamma)\{f_1 + f_2 + f_3\} \quad (60)$$

$$f_1 = [\cos\theta + g'\sin\theta] w \frac{g'}{\sqrt{1 + g'^2}}$$

$$f_2 = [(q - q_z)\cos\theta + g\sin\theta] w' \frac{g'}{\sqrt{1 + g'^2}}$$

$$f_3 = [(q - q_z)\cos\theta + g\sin\theta] w \frac{g''}{[1 + g'^2]^{\frac{3}{2}}}$$

$$\frac{\partial f_{grouser}}{\partial g_\theta} = 0 \quad (61)$$

$$\frac{d}{d\theta}\left(\frac{\partial f_{grouser}}{\partial g_\theta}\right) = 0 \quad (62)$$

The problem in optimization is to find g that satisfies the following equation.

$$\alpha(\beta, \gamma)[w \sin\theta\sqrt{1 + g'^2} - (f_1 + f_2 + f_3)] = 0 \quad (63)$$

Since $\alpha(\beta, \gamma) \neq 0$, the distribution of normal stress per unit depth, $\alpha$, is not related to the optimization process; thus, the equation (63) is abstracted under the assumption w'=0 through the following equation deployments.

$$\sin\theta\sqrt{1 + g'^2} - [\cos\theta + g'\sin\theta] \quad (64)$$
$$\frac{g'}{\sqrt{1 + g'^2}} - [(q - q_z)\cos\theta + g\sin\theta]\frac{g''}{[1 + g'^2]^{\frac{3}{2}}} = 0$$

$$\sin\theta\left[\sqrt{1 + g'^2} - \frac{g'^2}{\sqrt{1 + g'^2}} - \frac{gg''}{[1 + g'^2]^{\frac{3}{2}}}\right] - \quad (65)$$
$$\cos\theta\left[\frac{g'}{\sqrt{1 + g'^2}} + (q - q_z)\frac{g''}{[1 + g'^2]^{\frac{3}{2}}}\right] = 0$$

$$[1 + g'^2]^{-\frac{3}{2}}\{\sin\theta[[1 + g'^2]^2 - g'^2[1 + g'^2] - gg''] - \quad (66)$$
$$\cos\theta[g'[1 + g'^2] + (q - q_z)g'']\} = 0$$

Since $1 + g'^2 \neq 0$, the following equation is obtained and abstracted.

$$\sin\theta[[1 + g'^2]^2 - g'^2[1 + g'^2] - gg''] - \quad (67)$$
$$\cos\theta[g'[1 + g'^2] + (q - q_z)g''] = 0$$

$$\frac{[1 + g'^2]^2 - g'^2[1 + g'^2] - gg''}{g'[1 + g'^2] + (q - q_z)g''}\tan\theta - 1 = 0 \quad (68)$$

Finally, if the following equation is established: the optimal condition for the grouser shape is expressed by the following equation.

$$\frac{\partial \alpha}{\partial g'} = 0$$

$$\frac{1 + g'^2 - gg''}{g'[1 + g'^2] + (q - q_z)g''}\tan\theta - 1 = 0 \quad (69)$$

If the solutions of g that satisfies the optimal condition above are found, the solutions may be solutions at the minimum, maximum, or inflection points.

Subsequently, if the following equation is established:

$$\frac{\partial \alpha}{\partial g'} = 0$$

but $w' \neq 0$, the equation (63) is abstracted through the following equations.

$$w\sin\theta\sqrt{1 + g'^2} - [\cos\theta + g'\sin\theta]w\frac{g'}{\sqrt{1 + g'^2}} - [(q - q_z)\cos\theta + g\sin\theta] \quad (70)$$
$$w'\frac{g'}{\sqrt{1 + g'^2}} - [(q - q_z)\cos\theta + g\sin\theta]w\frac{g''}{[1 + g'^2]^{\frac{3}{2}}} = 0$$

$$\sin\theta\left[w\sqrt{1 + g'^2} - w\frac{g'^2}{\sqrt{1 + g'^2}} - w'\frac{gg'}{\sqrt{1 + g'^2}} - w\frac{gg''}{[1 + g'^2]^{\frac{3}{2}}}\right] - \quad (71)$$
$$\cos\theta\left[w\frac{g'}{\sqrt{1 + g'^2}} + (q - q_z)w'\frac{g'}{\sqrt{1 + g'^2}} + (q - q_z)w\frac{g''}{[1 + g'^2]^{\frac{3}{2}}}\right] = 0$$

$$[1 + g'^2]^{-\frac{3}{2}} \quad (72)$$
$$\{\sin\theta[w[1 + g'^2]^2 - wg'^2[1 + g'^2] - w'gg'[1 + g'^2] - wgg''] -$$
$$\cos\theta[wg'[1 + g'] + (q - q_z)w'g'[1 + g'] + (q - q_z)wg''] \} = 0$$

$$\sin\theta[w[1 + g'^2]^2 - wg'^2[1 + g'^2] - w'gg'[1 + g'^2] - wgg''] - \quad (73)$$
$$\cos\theta[wg'[1 + g'^2] + (q - q_z)w'g'[1 + g'^2] + (q - q_z)wg''] = 0$$

Since $1 + g'^2 \neq 0$, the above equations are abstracted as follows.

$$\frac{w[1 + g'^2]^2 - wg'^2[1 + g'^2] - w'gg'[1 + g'^2] - wgg''}{wg'[1 + g'^2] + (q - q_z)w'g'[1 + g'^2] + (q - q_z)wg''}\tan\theta - 1 = 0 \quad (74)$$

$$\frac{w + wg'^2 - w'gg'[1 + g'^2] - wgg''}{[w + (q - q_z)w']g'[1 + g'] + (q - q_z)wg''}\tan\theta - 1 = 0 \quad (75)$$

Finally, the following equation is given as the optimal condition considering the width shape of the wheel and grousers.

$$\frac{1+g'^2-gg''-\frac{w'}{w}gg'[1+g'^2]}{\left[1+(q-q_z)\frac{w'}{w}\right]g'[1+g'^2]+(q-q_z)g''}\tan\theta-1=0 \quad (76)$$

Here, the derivation process of the above equation (47) is shown as follows.

If the following case is considered:

$$\frac{\partial\alpha}{\partial g'}\neq 0$$

$\alpha$ in x and z direction is obtained by the following equations shown in the reference (Li, C., Zhang, T., and Goldman, D. I. (2013). A terradynamics of legged locomotion on granular media. Science, 339:1408-1412, the disclosure of which is incorporated herein by reference in its entirety).

$$\alpha_z^{generic}=\sum_{m=-1}^{1}\sum_{n=0}^{1}\left[A_{m,n}\cos 2\pi\left(\frac{m\beta(\theta,g')}{\pi}+\frac{n\gamma(\theta,g')}{2\pi}\right)+B_{m,n}\sin 2\pi\left(\frac{m\beta(\theta,g')}{\pi}+\frac{n\gamma(\theta,g')}{2\pi}\right)\right] \quad (77)$$

$$\alpha_x^{generic}=\sum_{m=-1}^{1}\sum_{n=0}^{1}\left[C_{m,n}\cos 2\pi\left(\frac{m\beta(\theta,g')}{\pi}+\frac{n\gamma(\theta,g')}{2\pi}\right)+D_{m,n}\sin 2\pi\left(\frac{m\beta(\theta,g')}{\pi}+\frac{n\gamma(\theta,g')}{2\pi}\right)\right] \quad (78)$$

where the parameters for the wheel-grouser shape, $\beta$ and $\gamma$, are given by the following equations.

$$\beta=\begin{cases}-\theta+\frac{\pi}{2}+\tan^{-1}\left(\frac{dg}{dq}\right) & \text{if }\left(0<\theta<\frac{\pi}{2}\right)\\ -\theta-\frac{\pi}{2}+\tan^{-1}\left(\frac{dg}{dq}\right) & \text{if }\left(-\frac{\pi}{2}\leq\theta\leq 0\right)\end{cases} \quad (79)$$

$$\gamma=\theta-\tan^{-1}\left(\frac{dg}{dq}\right)+\eta \quad (80)$$

Furthermore, the scaled $\alpha$ has the relation to the generic $\alpha$ as follows.

$$\alpha(\beta,\gamma)=\alpha^{scaled}=\zeta\alpha^{generic} \quad (81)$$

where $\zeta$ is the scaling factor that indicates the difference of soil.

For the optimization considering the soil properties, the contents of the equation (56) are derived from the following equations.

$$\frac{\partial f_{grouser}}{\partial g}=\alpha(\beta,\gamma)w\sin\theta\sqrt{1+g'^2} \quad (82)$$

$$\frac{\partial f_{grouser}}{\partial g'}=\frac{\partial\alpha(\beta,\gamma)}{\partial g'}[(q-q_z)\cos\theta+g\sin\theta]w\sqrt{1+g'^2}+\alpha(\beta,\gamma)[(q-q_z)\cos\theta+g\sin\theta]w\frac{g'}{\sqrt{1+g'^2}} \quad (83)$$

$$\frac{d}{dq}\left(\frac{\partial f_{grouser}}{\partial g'}\right)=\{h_0+h_1+h_2+h_3\}+\{f_0+f_1+f_2+f_3\} \quad (84)$$

$$h_0=\frac{\partial^2\alpha(\beta,\gamma)}{\partial q\partial g'}s_0w\sqrt{1+g'^2},\ f_0=\frac{\partial\alpha(\beta,\gamma)}{\partial q}s_0w\frac{g'}{\sqrt{1+g'^2}}$$

$$h_1=\frac{\partial\alpha(\beta,\gamma)}{\partial g'}s_1w\sqrt{1+g'^2},\ f_1=\alpha(\beta,\gamma)s_1w\frac{g'}{\sqrt{1+g'^2}}$$

$$h_2=\frac{\partial\alpha(\beta,\gamma)}{\partial g'}s_0w'\sqrt{1+g'^2},\ f_2=\alpha(\beta,\gamma)s_0w'\frac{g'}{\sqrt{1+g'^2}}$$

$$h_3=\frac{\partial\alpha(\beta,\gamma)}{\partial g'}s_0w\frac{g'g''}{\sqrt{1+g'^2}},\ f_3=\alpha(\beta,\gamma)s_0w\frac{g''}{[1+g'^2]^{\frac{3}{2}}}$$

$$s_0=[(q-q_z)\cos\theta+g\sin\theta]$$
$$s_1=[\cos\theta+g'\sin\theta]$$

$$\frac{\partial f_{grouser}}{\partial g_\theta}=0 \quad (85)$$

$$\frac{d}{d\theta}\left(\frac{\partial f_{grouser}}{\partial g_\theta}\right)=0 \quad (86)$$

The problem in optimization is to find g that satisfies the following equation.

$$\alpha(\beta,\gamma)w\sin\theta\sqrt{1+g'^2}[(h_0+h_1+h_2+h_3)+(f_0+f_1+f_2+f_3)]=0 \quad (87)$$

Under the assumption w'=0, the equation (87) is abstracted through the following deployments.

$$-\sin\theta\left[\left(-\alpha+\frac{\partial^2\alpha}{\partial q\partial g'}g+\alpha_d g'\right)\sqrt{1+g'^2}+\left(\alpha g'+\frac{\partial\alpha}{\partial q}g+\alpha_d gg''\right)\frac{g'}{\sqrt{1+g'^2}}+\alpha\frac{gg''}{[1+g'^2]^{\frac{3}{2}}}\right]-\cos\theta\left[\left(\frac{\partial^2\alpha}{\partial q\partial g'}(q-q_z)+\alpha_d\right)\sqrt{1+g'^2}+\left(\alpha_d(q-q_z)g''+\frac{\partial\alpha}{\partial q}(q-q_z)+\alpha\right)\frac{g'}{\sqrt{1+g'^2}}+\alpha\frac{(q-q_z)g''}{[1+g'^2]^{\frac{3}{2}}}\right]=0 \quad (88)$$

where $\alpha(\beta,\gamma)$ is abbreviated as $\alpha$.

$$[1+g'^2]^{-\frac{3}{2}}\left\{\sin\theta\left[\left(-\alpha+\frac{\partial^2\alpha}{\partial q\partial g'}g+\alpha_d g'\right)(1+g'^2)^2+\left(\alpha g'+\frac{\partial\alpha}{\partial q}g+\alpha_d gg''\right)g'(1+g'^2)+\alpha gg''\right]+\cos\theta\left[\left(\frac{\partial^2\alpha}{\partial q\partial g'}(q-q_z)+\alpha_d\right)(1+g'^2)^2+\left(\alpha_d(q-q_z)g''+\frac{\partial\alpha}{\partial q}(q-q_z)+\alpha\right)g'(1+g'^2)+\alpha(q-q_z)g''\right]\right\}=0 \quad (89)$$

Since $1+g'^2\neq 0$, the following equations are obtained.

$$\left\{ \sin\theta \left[ \left( -\alpha + \frac{\partial^2 \alpha}{\partial q \partial g'} g + \alpha_d g' \right)(1 + g'^2)^2 + \right. \right.$$
$$\left( \alpha g' + \frac{\partial \alpha}{\partial q} g + \alpha_d g g'' \right) g'(1 + g'^2) + \alpha g g'' \right] +$$
$$\cos\theta \left[ \left( \frac{\partial^2 \alpha}{\partial q \partial g'} (q - q_z) + \alpha_d \right)(1 + g'^2)^2 + \right.$$
$$\left( \alpha_d (q - q_z) g'' + \frac{\partial \alpha}{\partial q} (q - q_z) + \alpha \right) g'(1 + g'^2) +$$
$$\left. \left. \alpha(q - q_z) g'' \right] \right\} = 0 \qquad (90)$$

$$\frac{\left( -\alpha + \frac{\partial^2 \alpha}{\partial q \partial g'} g + \alpha_d g' \right)(1 + g'^2)^2 + }{\left( \frac{\partial^2 \alpha}{\partial q \partial g'} (q - q_z) + \alpha_d \right)(1 + g'^2)^2 + } \qquad (91)$$
$$\frac{\left( \alpha g' + \frac{\partial \alpha}{\partial q} g + \alpha_d g g'' \right) g'(1 + g'^2) + \alpha g g''}{\left( \alpha_d (q - q_z) g'' + \frac{\partial \alpha}{\partial q} (q - q_z) + \alpha \right) g'(1 + g'^2) + \alpha (q - q_z) g''}$$

$$\tan\theta + 1 = 0$$

At this point, the calculation is focused only on the numerator.

$$\left( -\alpha + \frac{\partial^2 \alpha}{\partial q \partial g'} g + \alpha_d g' \right)(1 + 2g'^2 + g'^4) + \qquad (92)$$
$$\left( \alpha g' + \frac{\partial \alpha}{\partial q} g + \alpha_d g g'' \right) g'(1 + g'^2) + \alpha g g'' =$$
$$\alpha_d g'(1 + g'^2) + \alpha_{dd} g g'' - \alpha(1 + g'^2 - g g'')$$

where the following relations are utilized for the above abstraction.

$$\frac{\partial \alpha}{\partial q} = \frac{\partial \alpha}{\partial g'} \frac{\partial g'}{\partial q} = g'' \frac{\alpha_d}{1 + g'^2} \qquad (93)$$

$$\frac{\partial^2 \alpha}{\partial q \partial g'} = \frac{\partial}{\partial q} \frac{\alpha_d}{1 + g'^2} = \qquad (94)$$
$$\alpha_d \frac{\partial}{\partial q} \frac{1}{1 + g'^2} + \frac{1}{1 + g'^2} \frac{\partial \alpha_d}{\partial g'} \frac{\partial g'}{\partial q} = \frac{-2g' g'' \alpha_d + \alpha_{dd} g''}{(1 + g'^2)^2}$$

Further, the denominator is abstracted to the following equation.

$$\left( \frac{\partial^2 \alpha}{\partial q \partial g'} (q - q_z) + \alpha_d \right)(1 + g'^2)^2 + \qquad (95)$$
$$\left( \alpha_d (q - q_z) g'' + \frac{\partial \alpha}{\partial q} (q - q_z) + \alpha \right) g'(1 + g'^2) + \alpha(q - q_z) g'' =$$
$$\left( \frac{-2g' g'' \alpha_d + \alpha_{dd} g''}{(1 + g'^2)} (q - q_z) + \frac{\alpha_d}{1 + g'^2} \right)(1 + g'^2)^2 +$$
$$\left( \frac{\alpha_d g''}{1 + g'^2} (q - q_z) + \frac{\alpha_d g''}{1 + g'^2} (q - q_z) + \alpha \right) g'(1 + g'^2) +$$
$$\alpha(q - q_z) g'' =$$
$$\alpha_d (1 + g'^2) + \alpha_{dd} g''(q - q_z) + \alpha[g'(1 + g'^2) + g''(q - q_z)]$$

Finally, the optimal condition considering the soil properties is described as follows.

$$\frac{\alpha_d g'(1 + g'^2) + \alpha_{dd} g g'' - \alpha(1 + g'^2 - g g'')}{\alpha_d (1 + g'^2) + \alpha_{dd} g''(q - q_z) + \alpha[g'(1 + g'^2) + g''(q - q_z)]} \tan\theta + 1 = 0 \qquad (96)$$

If the solutions of g that satisfies the optimal condition above are found, the solutions may be solutions at the minimum, maximum, or inflection points.

What is claimed is:

1. A wheel, comprising:
   a circular wheel main body; and
   at least one grouser that is provided along an outer circumference of the circular wheel main body and has a contact surface drawing a first tangent line, the first tangent line being inclined opposite to a rotational direction of the circular wheel main body from the center line of the circular wheel main body,
   wherein the at least one grouser includes a projection member, the projection member being provided to be inclined opposite to the rotational direction of the circular wheel main body from the center line of the circular wheel main body and having the contact surface of a rectangular shape, and
   the center line of the circular wheel main body and the contact surface of the projection member defines an angle of approximately 90 degrees.

2. The wheel according to claim 1, wherein the at least one grouser includes 1 to 48 grousers.

3. The wheel according to claim 2, wherein the at least one grouser includes 24 grousers.

4. A wheel, comprising:
   a circular wheel main body; and
   at least one grouser that is provided along an outer circumference of the circular wheel main body and has a first contact surface and a second contact surface,
   the first contact surface drawing a first tangent line that is inclined opposite to a first rotational direction of the circular wheel main body from a first center line of the circular wheel main body, and
   the second contact surface drawing a second tangent line that is inclined opposite to a second rotational direction from a second center line of the circular wheel main body, the second rotational direction being a direction opposite to the first rotational direction
   wherein the at least one grouser includes at least one projection member, the at least one projection member being provided to be inclined opposite to the rotational direction of the circular wheel main body from the first center line of the circular wheel main body and having the contact surface of a rectangular shape, and
   the first center line of the circular wheel main body and the first contact surface defines an angle of approximately 90 degrees, and the second center line of the circular wheel main body and the second contact surface defines an angle of approximately 90 degrees.

5. The wheel according to claim 4, wherein
   the at least one grouser includes a ridge line at which the first contact surface and the second contact surface intersect with each other.

6. The wheel according to claim 4, wherein the at least one grouser includes 6 grousers.

* * * * *